(12) United States Patent
Wang et al.

(10) Patent No.: US 12,375,689 B2
(45) Date of Patent: *Jul. 29, 2025

(54) ENCODER, A DECODER AND CORRESPONDING METHODS OF DEBLOCKING FILTER ADAPTATION

(71) Applicant: HUAWEI TECHNOLOGIES CO., LTD., Guangdong (CN)

(72) Inventors: Biao Wang, Shenzhen (CN); Anand Meher Kotra, Munich (DE); Semih Esenlik, Munich (DE); Jianle Chen, San Diego, CA (US); Han Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/607,876

(22) Filed: Mar. 18, 2024

(65) Prior Publication Data

US 2024/0259569 A1    Aug. 1, 2024

Related U.S. Application Data

(63) Continuation of application No. 17/370,151, filed on Jul. 8, 2021, now Pat. No. 11,962,783, which is a
(Continued)

(51) Int. Cl.
*H04N 19/159*    (2014.01)
*H04N 19/105*    (2014.01)
(Continued)

(52) U.S. Cl.
CPC ......... *H04N 19/159* (2014.11); *H04N 19/105* (2014.11); *H04N 19/117* (2014.11); *H04N 19/139* (2014.11); *H04N 19/61* (2014.11)

(58) Field of Classification Search
CPC .. H04N 19/105; H04N 19/117; H04N 19/139; H04N 19/157; H04N 19/159;
(Continued)

(56) References Cited

U.S. PATENT DOCUMENTS 9,374,578 B1    6/2016 Mukherjee et al.
11,240,493 B2   2/2022 Wang et al.
(Continued)

FOREIGN PATENT DOCUMENTS

CN    101472176 A    7/2009
CN    102196263 A    9/2011
(Continued)

OTHER PUBLICATIONS

Document: JVET-L1031-v4, Andrey Norkin et al, Description of Core Experiment 11 (CE11): Deblocking, Joint Video Experts Team (JVET) of ITU-T SG 16 WP 3 and ISO/IEC JTC 1/SC 29/WG 11, 12th Meeting: Macao, CN, Oct. 3-12, 2018, total 33 pages.
(Continued)

*Primary Examiner* — Behrooz M Senfi
(74) *Attorney, Agent, or Firm* — WOMBLE BOND DICKINSON (US) LLP

(57) ABSTRACT

The present disclosure provides a coding method, wherein the coding includes decoding or encoding, and the method comprises determining whether a current coding unit is predicted by application of combined inter-intra prediction (CIIP); and in response to determining that the current coding unit is predicted by application of CIIP, setting a boundary strength of a boundary of the current coding unit to a first value.

20 Claims, 19 Drawing Sheets

Related U.S. Application Data continuation of application No. PCT/CN2020/072442, filed on Jan. 16, 2020.

(60) Provisional application No. 62/793,840, filed on Jan. 17, 2019.

(51) Int. Cl.
*H04N 19/117* (2014.01)
*H04N 19/139* (2014.01)
*H04N 19/61* (2014.01)

(58) Field of Classification Search
CPC ...... H04N 19/176; H04N 19/61; H04N 19/82; H04N 19/86
USPC ...................................... 375/240.02
See application file for complete search history.

(56) References Cited

U.S. PATENT DOCUMENTS

| | | | |
|---|---|---|---|
| 11,356,699 B2 | 6/2022 | Tsai et al. | |
| 11,558,611 B2 | 1/2023 | Bordes et al. | |
| 11,652,984 B2 | 5/2023 | Van Der Auwera et al. | |
| 11,962,783 B2 * | 4/2024 | Wang | H04N 19/157 |
| 2013/0266061 A1 | 10/2013 | An et al. | |
| 2020/0228832 A1 * | 7/2020 | Tsai | H04N 19/593 |

FOREIGN PATENT DOCUMENTS

| | | |
|---|---|---|
| CN | 103404147 A | 11/2013 |
| CN | 103891286 A | 6/2014 |
| CN | 103947203 A | 7/2014 |
| CN | 106797466 A | 5/2017 |
| CN | 107925773 A | 4/2018 |
| CN | 108696752 A | 10/2018 |
| JP | 2014506438 A | 3/2014 |
| KR | 20210027252 A | 3/2021 |
| WO | 2018224004 A1 | 12/2018 |
| WO | 2019029560 A1 | 2/2019 |
| WO | 2020098782 A1 | 5/2020 |
| WO | 2020114513 A1 | 6/2020 |

OTHER PUBLICATIONS

Document: JVET-M0908, K. Andersson et al, CE11-related: Specification text for combination of JVET-M0103 and JVET-M0294, Joint Video Experts Team (JVET) of ITU-T SG 16 WP 3 and ISO/IECJTC 1/SC 29/WG11, 13th Meeting: Marrakech, MA, Jan. 9-18, 2019, total 2 pages.

Document: JVET-L1001-v3, Benjamin Bross et al, Versatile Video Coding (Draft 3), Joint Video Experts Team (JVET) of ITU-T SG 16 WP 3 and ISO/IEC JTC 1/SC 29/WG 11, 12th Meeting: Macao, CN, Oct. 3-12, 2018, total 181pages.

Document: JVET-M0103-v1, K. Andersson et al, Deblocking for multi-hypothesis intra inter prediction, Joint Video Experts Team (JVET) of ITU-T SG 16 WP 3 and ISO/IEC JTC 1/SC 29/WG 11, 3th Meeting: Marrakech, MA, Jan. 9-18, 2019, total 5 pages.

Document: JVET-M0294, Biao Wang et al, CEIO-related: modification for blocks applied with combined inter-intra prediction, Joint Video Experts Team (JVET) ofITU-T SG 16 WP 3 and ISO/IECJTC 1/SC 29/WG11, 13th Meeting: Marrakesh, Morocco, Jan. 9-18, 2019, total 6 pages.

ITU-T H.264(Apr. 2017), Series H: Audiovisual and Multimedia Systems, Infrastructure of audiovisual services—Coding of moving video, Advanced video coding for generic audiovisual services, total 812 pages.

Document: JVET-M0299-v2, Kenneth Andersson et al, CE11: Deblocking for 4×N, N×4 and 8×N and N×8 block boundaries that not are aligned with 8×8 grid (test 11.2.1), Joint Video Experts Team (JVET) of ITU-T SG 16 WP 3 and ISO/IEC JTC 1/SC 29/WG 11, 13th Meeting: Marrakech, MA, Jan. 9-18, 2019, total 7 pages.

Document: JVET-L1001_v9, Benjamin Bross et al, Versatile Video Coding(Draft 3), Joint Video Experts Team (JVET) of ITU-T SG 16 WP 3 and ISO/IEC JTC 1/SC 29/WG 11, 12th Meeting: Macao, CN, Oct. 3-12, 2018, total 235 pages.

ITU-T H.265(Feb. 2018), Series H: Audiovisual and Multimedia Systems Infrastructure of audiovisual services—Coding of moving video, High efficiency video coding, total 692 pages.

* cited by examiner

FIG.11

ENCODER, A DECODER AND CORRESPONDING METHODS OF DEBLOCKING FILTER ADAPTATION

CROSS-REFERENCE TO RELATED APPLICATION

This application is a continuation of U.S. patent application Ser. No. 17/370,151, filed on Jul. 8, 2021, which is a continuation of International Application No. PCT/CN2020/072442, filed on Jan. 16, 2020. The International Application claims priority to U.S. Patent Application No. 62/793,840, filed on Jan. 17, 2019. All of the afore-mentioned patent applications are hereby incorporated by reference in their entireties.

TECHNICAL FIELD

Embodiments of the present application generally relate to the field of picture processing and more particularly to an encoder, a decoder, and corresponding methods of deblocking filter adaptation.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY OF THE DISCLOSURE

Embodiments of the present application provide apparatuses and methods for encoding and decoding according to the independent claims.

The foregoing and other objects are achieved by the subject matter of the independent claims. Further implementation forms are apparent from the dependent claims, the description and the figures.

One embodiment of the present disclosure is a coding method, wherein the coding includes decoding or encoding, and the method comprises determining whether a current coding unit is predicted by application of combined inter-intra prediction (CIIP); and upon determination that the current coding unit is predicted by application of CIIP, setting a boundary strength of a boundary of the current coding unit to a first value.

The first value may lie in the range from 1 to 2. The first value may in particular be 2. Alternatively, the first value may be 1. In the latter case, the method may further comprise incrementing the first value by 1 upon determination that one of the following conditions holds:
at least one of the current coding unit and an adjacent coding unit that is adjacent to the boundary of the current coding unit has non-zero transform coefficients,
an absolute difference between motion vectors used to predict the current coding unit and the adjacent coding unit is greater than or equal to one integer sample,
the current coding unit and the adjacent coding unit are predicted on the basis of different reference pictures,
a number of motion vectors used to predict the current coding unit and the adjacent coding unit differs.

In an embodiment, the method may further comprise, when the boundary of the current coding unit is a horizontal edge, determining whether an adjacent coding unit that is adjacent to the boundary of the current coding unit is in a different coding tree unit (CTU).

In an embodiment, the method may further comprise setting a boundary strength of a boundary of a sub-coding unit to a second value, wherein the current coding unit comprises at least two sub-coding units, and the boundary of the sub-coding unit is a boundary between the at least two sub-coding units. The second value may in particular be 1. When the boundary of the sub-coding unit is an edge of a transform unit, the second value may be equal to the first value. When the boundary of the sub-coding unit is not an edge of a transform unit, the second value may be different from the first value.

In an embodiment, the method may further comprise determining whether the boundary of the current coding unit is aligned with an 8×8 grid, and upon determination that the boundary of the current coding unit is not aligned with the 8×8 grid, setting the boundary strength of the boundary of the current coding unit to zero.

In an embodiment, the method may further comprise determining whether the boundary of the sub-coding unit is aligned with a sub-grid, the sub-grid being a 4×4 grid or an 8×8 grid, and upon determination that the boundary of the sub-coding unit is not aligned with the sub-grid, setting the boundary strength of the boundary of the sub-coding unit to zero.

In an embodiment, the method may further comprise performing deblocking on a boundary for a luma component when the boundary strength of said boundary is greater than zero. The method may further comprise performing deblocking on a boundary for chroma components when the boundary strength of said boundary is greater than 1.

In an embodiment, when the current coding unit is predicted by application of CIIP, the current coding unit may be considered as a coding unit with intra prediction when performing deblocking.

Another embodiment of the present disclosure is an encoder comprising processing circuitry for carrying out the method according to any one of the above embodiments.

Another embodiment of the present disclosure is a decoder comprising processing circuitry for carrying out the method according to any one of the above embodiments.

Another embodiment of the present disclosure is a computer program product comprising instructions which, when the program is executed by a computer, cause the computer to carry out the method according to any one of the above embodiments.

Another embodiment of the present disclosure is a decoder comprising one or more processors; and a non-transitory computer-readable storage medium coupled to the one or more processors and storing instructions for execution by the one or more processors, wherein the instructions, when executed by the one or more processors, configure the decoder to carry out the method according to any one of the above embodiments.

Another embodiment of the present disclosure is an encoder comprising one or more processors; and a non-transitory computer-readable storage medium coupled to the one or more processors and storing instructions for execution by the one or more processors, wherein the instructions, when executed by the one or more processors, configure the encoder to carry out the method according to any one of the above embodiments.

The present disclosure further provides the following aspects counted from one.

According to a first aspect, the disclosure relates to a coding method, wherein the coding includes decoding or encoding, and the method comprises determining whether a current coding unit (or coding block) is predicted by application of combined inter-intra prediction or not; when the current coding unit is predicted by application of combined inter-intra prediction, setting a boundary strength (Bs) of a boundary of the current coding unit to a first value; and setting a boundary strength (Bs) of a boundary of a sub-coding unit (or sub-block, or sub-partition) to a second value, wherein the current coding unit comprises at least two sub-coding units, and the boundary of the sub-coding unit is a boundary between the at least two sub-coding units.

The first value may be 2. The second value may be 1. The first value may be the same as or different from the second value. When the boundary of the sub-coding unit is a boundary (or an edge) of a transform unit, the first value may be the same as the second value. When the boundary of the sub-coding unit is not a boundary (or an edge) of a transform unit, the first value may be different from the second value.

In an embodiment, the method may further comprise performing deblocking when a value of the Bs is greater than zero for a luma component; or performing deblocking when the value of the Bs is greater than 1 for chroma components, wherein the value of the Bs is one of the first value or the second value.

When the current coding unit (or block) is predicted by application of combined inter-intra prediction, the current coding unit may be considered as a unit with intra prediction when performing deblocking.

According to a second aspect, the disclosure relates to an encoder comprising processing circuitry for carrying out any one of the methods according to the first aspect.

According to a third aspect, the disclosure relates to a decoder comprising processing circuitry for carrying out any one of the methods according to the first aspect.

According to a fourth aspect, the disclosure relates to a computer program product comprising a program code for performing any one of the methods according to the first aspect.

According to a fifth aspect, the disclosure relates to a decoder, comprising one or more processors; and a non-transitory computer-readable storage medium coupled to the processors and storing programming for execution by the processors, wherein the programming, when executed by the processors, configures the decoder to carry out any one of the methods according to the first aspect.

According to a sixth aspect, the disclosure relates to an encoder, comprising one or more processors; and a non-transitory computer-readable storage medium coupled to the processors and storing programming for execution by the processors, wherein the programming, when executed by the processors, configures the encoder to carry out any one of the methods according to the first aspect.

According to a seventh aspect, the disclosure relates to a coding method, wherein the coding includes decoding or encoding, including: determining whether at least one of two blocks is a block with a CIIP (or MH) prediction, wherein the two blocks include a first block (block Q) and a second block (block P), and wherein the two blocks are associated with a boundary; setting a boundary strength (Bs) of the boundary to a first value when at least one of the two blocks is a block with the CIIP prediction; and setting a boundary strength (Bs) of the boundary to a second value when none of the two blocks is a block with the CIIP prediction.

The method according to the seventh aspect of the disclosure can be performed by the apparatus according to the eighth aspect of the disclosure. Further features and implementation forms of the apparatus according to the eighth aspect of the disclosure correspond to the features and implementation forms of the method according to the seventh aspect of the disclosure.

According to a ninth aspect, the disclosure relates to an apparatus for decoding a video stream including a processor and a memory. The memory stores instructions that cause the processor to perform the method according to the seventh aspect.

According to a tenth aspect, the disclosure relates to an apparatus for encoding a video stream including a processor and a memory. The memory stores instructions that cause the processor to perform the method according to the seventh aspect.

According to an eleventh aspect, a computer-readable storage medium having stored thereon instructions that when executed causes one or more processors configured to code video data is proposed. The instructions cause the one or more processors to perform a method according to the seventh aspect or any possible embodiment of the seventh aspect.

According to a twelfth aspect, the disclosure relates to a computer program comprising program code for performing the method according to the seventh aspect or any possible embodiment of the seventh aspect when executed on a computer.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the disclosure are described in more detail with reference to the attached figures and drawings, in which:

FIG. 11 is a diagram showing adjacent blocks of a boundary;

Figure 1A:
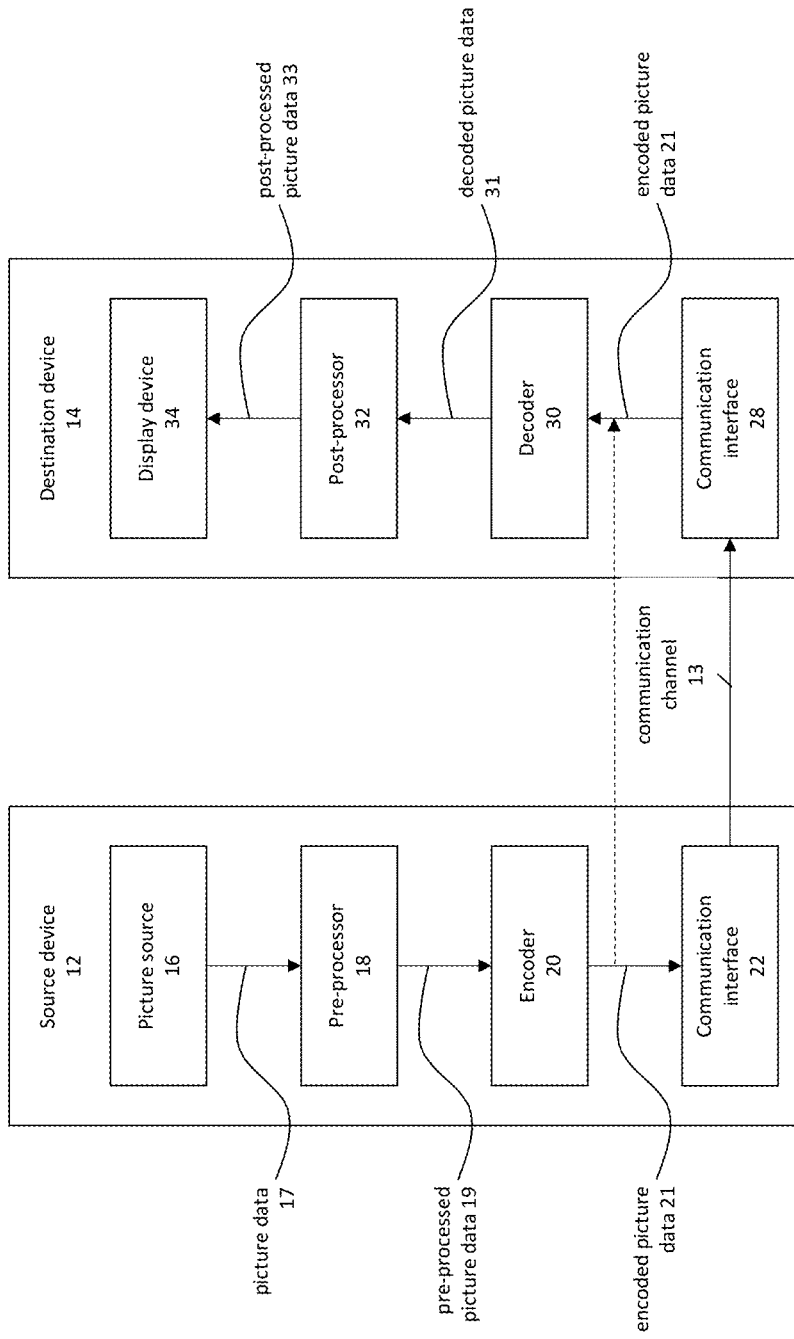
FIG. 1A is a block diagram showing an example of a video coding system configured to implement embodiments of the disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture", the term "frame" or "image" may be used as synonyms in the field of video coding. Video coding (or coding in general) comprises two parts: video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss occurs during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 may be configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be an optional component.

The video encoder 20 may be configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 may be configured to receive the encoded picture data 21 (or any further processed version thereof), e.g. directly from the source device 12 or from any other source, e.g. a storage device, such as an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or as bi-directional communication interfaces, and may be configured to send and receive messages, e.g. to set up a connection, to acknowledge and exchange any other information related to the communication link and/or data transmission, such as encoded picture data transmission.

The decoder 30 may be configured to receive the encoded picture data 21 and provide decoded picture data 31 or a decoded picture 31 (further details will be described below, e.g., based on FIG. 3 or FIG. 5).

The post-processor 32 of destination device 14 may be configured to post-process the decoded picture data 31 (also called reconstructed picture data), e.g. the decoded picture 31, to obtain post-processed picture data 33, such as a post-processed picture 33. The post-processing performed by the post-processing unit 32 may comprise any one or more of color format conversion (e.g. from YCbCr to RGB), color correction, trimming, or re-sampling, or any other processing, e.g. for preparing the decoded picture data 31 for display, e.g. by display device 34.

The display device 34 of the destination device 14 may be configured to receive the post-processed picture data 33 for displaying the picture, e.g. to a user or viewer. The display device 34 may be or comprise any kind of display for representing the reconstructed picture, such as an integrated or external display or monitor. The display may be a liquid crystal displays (LCD), an organic light emitting diodes (OLED) display, a plasma display, a projector, a micro LED display, a liquid crystal on silicon (LCoS), a digital light processor (DLP) or any kind of other display.

Although FIG. 1A depicts the source device 12 and the destination device 14 as separate devices, embodiments of devices may also comprise both devices or both functionalities, i.e. the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
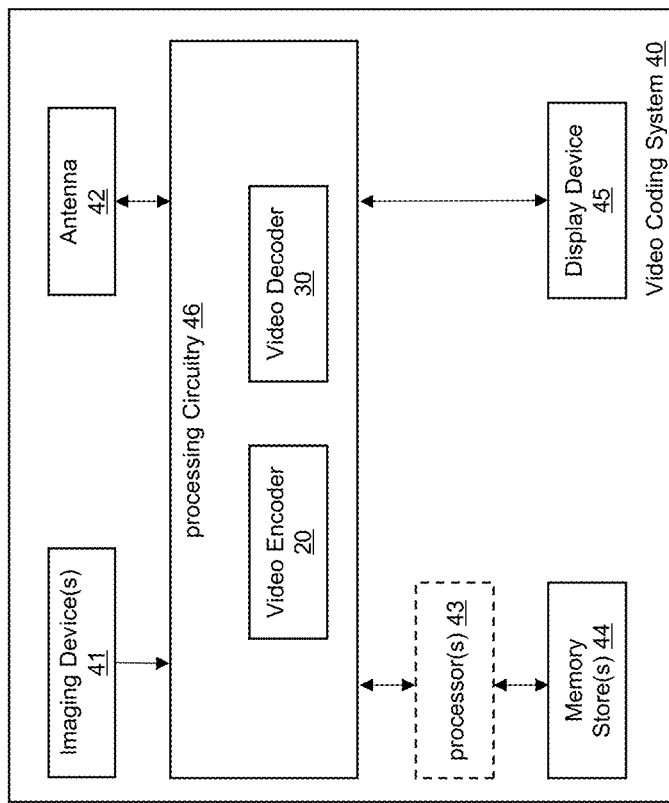
FIG. 1B is a block diagram showing another example of a video coding system configured to implement embodiments of the disclosure.

The encoder 20 (e.g. a video encoder 20) or the decoder 30 (e.g. a video decoder 30) or both, encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Video encoder 20 and video decoder 30 may be integrated as part of a combined encoder/decoder (CODEC) in a single device, for example, as shown in FIG. 1B.

The video coding system 40 shown in FIG. 1B comprises a processing circuitry implementing both a video encoder 20 and a video decoder 30. In addition, one or more imaging devices 41, such as a camera for capturing real-world pictures, an antenna 42, one or more memory stores 44, one or more processors 43 and/or a display device 45, such the display device 34 described above, may be provided as part of the video coding system 40.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver devices, broadcast transmitter devices, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding systems (e.g., video encoding or video decoding) that do not necessarily include any data communication between the encoding and decoding devices. In other examples, data is retrieved from a local memory, streamed over a network, or the like. A video encoding device may encode and store data in memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
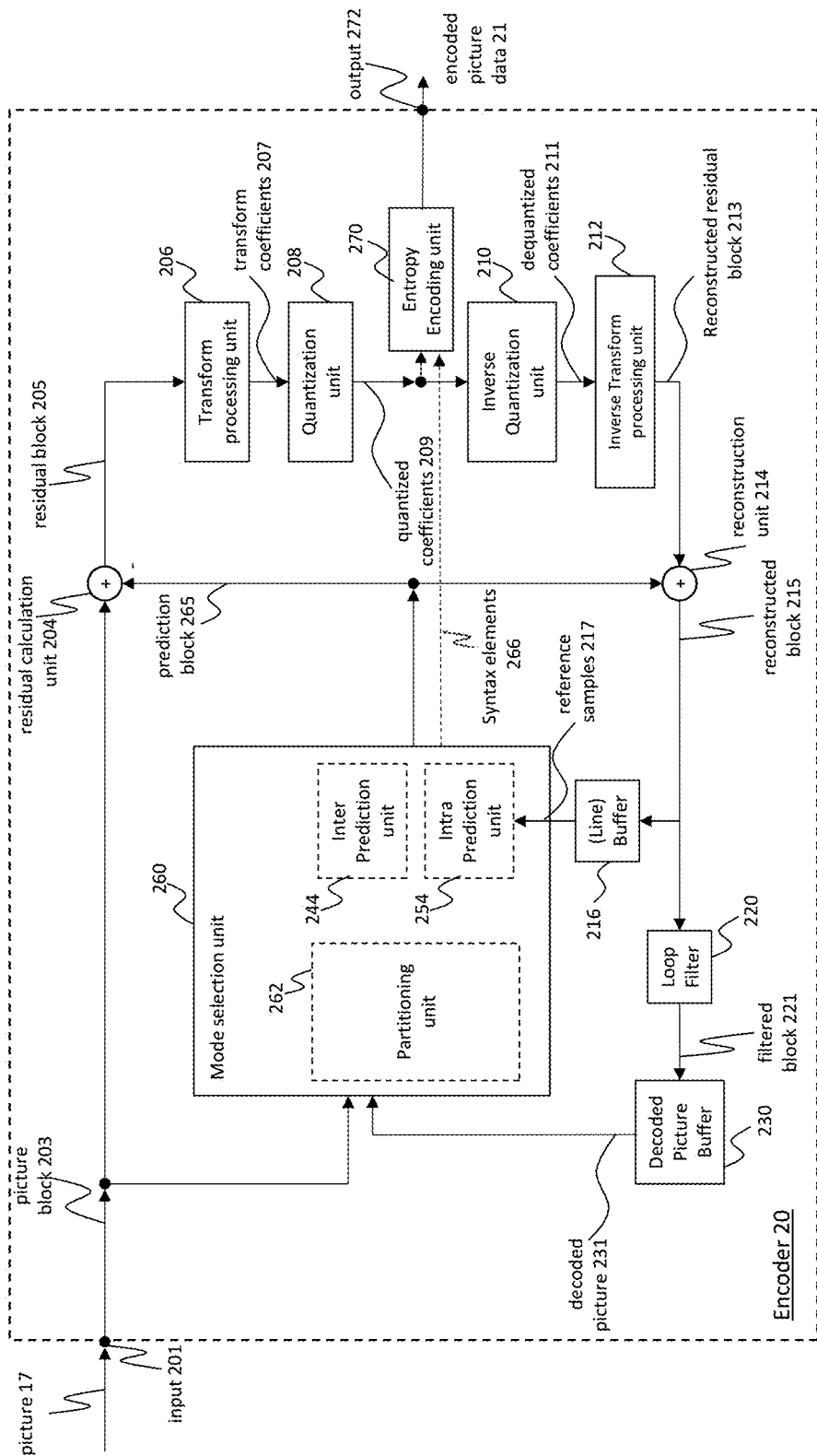
FIG. 2 is a block diagram showing an example of a video encoder configured to implement embodiments of the disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and an inverse transform processing unit 212, a reconstruction unit 214, a (line) buffer 216, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. The inter prediction unit 244 may include a motion estimation unit and a motion compensation unit (not shown). A video encoder 20 as shown in FIG. 2 may also be referred to as a hybrid video encoder or a video encoder according to a hybrid video codec.

Figure 3:
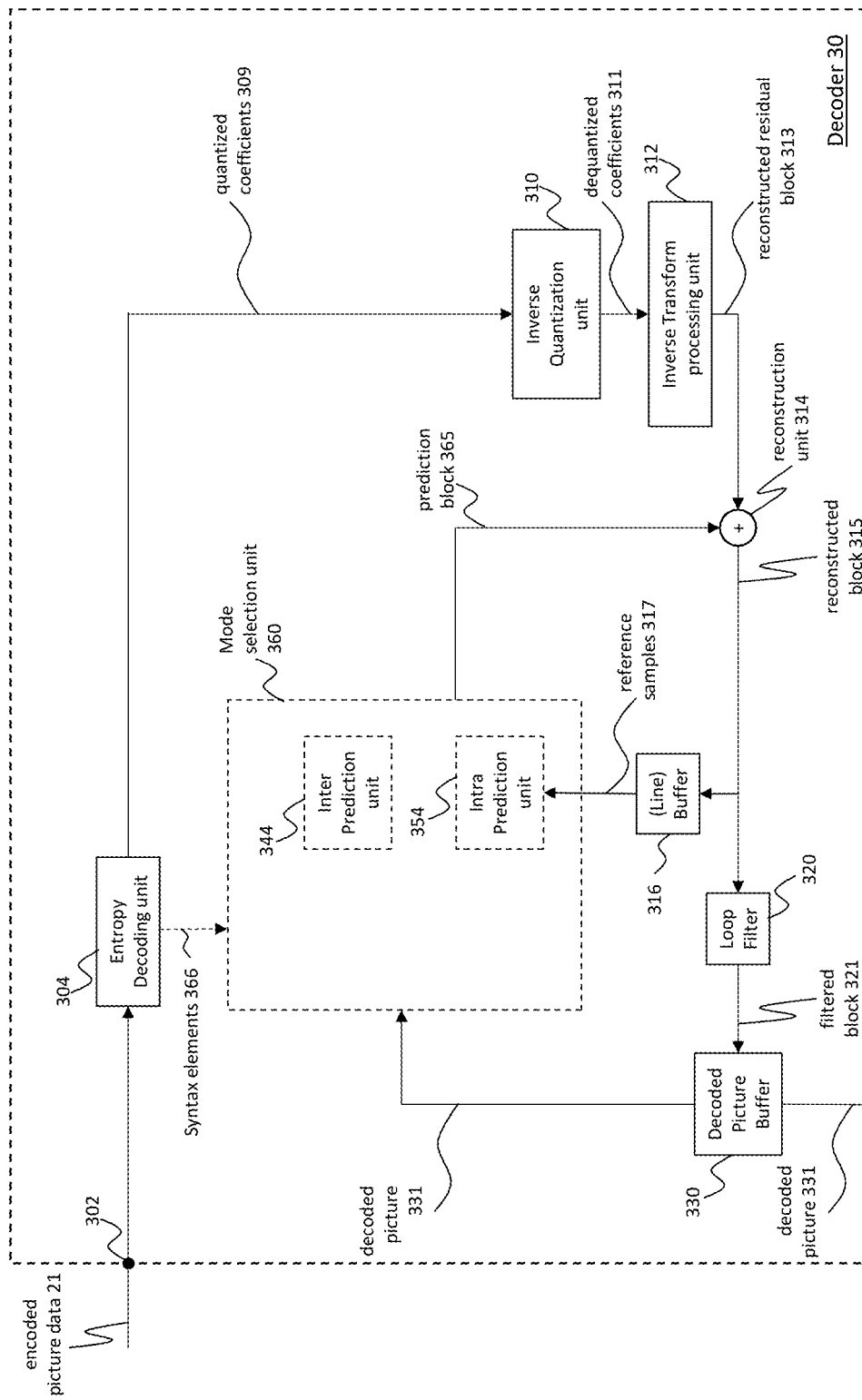
FIG. 3 is a block diagram showing an example structure of a video decoder configured to implement embodiments of the disclosure.

The residual calculation unit 204, the transform processing unit 206, the quantization unit 208, and the mode selection unit 260 may be referred to as forming a forward signal path of the encoder 20, whereas the inverse quantization unit 210, the inverse transform processing unit 212, the reconstruction unit 214, the (line) buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. a picture of a sequence of pictures forming a video or video sequence. The received picture or picture data may also be a pre-processed picture 19 (or pre-processed picture data 19). For the sake of simplicity the following description refers to the picture 17. The picture 17 may also be referred to as a current picture or a picture to be coded (in particular, in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in the horizontal and vertical direction (or axis) of the array or picture defines the size and/or resolution of the picture. For representation of color, typically three color components are employed, i.e. the picture may be represented as or include three sample arrays. In RBG format or color space, a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa. The process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 color format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (according to H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in the horizontal and vertical direction (or axis) of the block 203 defines the size of the block 203. Accordingly, a block may, for example, comprise an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise one or more blocks (e.g. CTUs) or one or more tiles, wherein each tile may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, such as a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively, the transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit transform coefficient during quantization, where n is greater than m. The degree of quantization may be modified by adjusting a quantization parameter (QP). For example for scalar quantization, different scalings may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may, for example, be an index of a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one examplary implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively, the quantization unit 208) may be configured to output quantization parameters (QPs), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as a transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit may be configured to smooth pixel transitions, or otherwise improve the video quality. The loop filter unit 220 may comprise one or more loop filters such as a de-blocking filter, a sample-adaptive offset (SAO) filter or one or more other filters, such as a bilateral filter, an adaptive loop filter (ALF), a sharpening, a smoothing filter or a collaborative filter, or any combination thereof. Although the loop filter unit 220 is shown in FIG. 2 as being an in-loop filter, in other configurations, the loop filter unit 220 may be implemented as a post loop filter. The filtered block 221 may also be referred to as a filtered reconstructed block 221.

Embodiments of the video encoder 20 (respectively, the loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may also be configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, such as an original block 203 (current block 203 of the current picture 17), and reconstructed picture data, such as filtered and/or unfiltered reconstructed samples or blocks of the same (current) picture and/or from one or a plurality of previously decoded pictures, e.g. from decoded picture buffer 230 or other buffers (e.g. line buffer 216). The reconstructed picture data is used as reference picture data for prediction, e.g. inter-prediction or intra-prediction, to obtain a prediction block 265 or predictor 265. In particular, reference samples 217 from the line buffer 216 may be used by intra-prediction unit 254.

Mode selection unit 260 may be configured to determine or select a partitioning for a current block prediction mode (including no partitioning) and a prediction mode (e.g. an intra- or inter-prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which again form blocks), e.g. iteratively using quad-tree-partitioning (QT), binary-tree partitioning (BT) or triple-tree-partitioning (TT) or any combination thereof, and to perform the prediction for each of the block partitions or sub-blocks, wherein the mode selection comprises the selection of the tree-structure of the partitioned block 203 and the prediction modes are applied to each of the block partitions or sub-blocks.

In the following, the partitioning (e.g. by partitioning unit 262) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to as tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as a binary-tree (BT), a tree using partitioning into three partitions is referred to as a ternary-tree (TT), and a tree using partitioning into four partitions is referred to as a quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), a prediction unit (PU), or a transform unit (TU) and/or to the corresponding blocks, e.g. a coding tree block (CTB), a coding block (CB), a transform block (TB) or a prediction block (PB).

For example, a coding tree unit (CTU) may be or comprise a CTB of luma samples and two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples and two corresponding coding blocks of chroma samples of a picture that has three sample arrays, or a coding block of samples of a monochrome picture or a picture that is coded using three separate color planes and syntax structures used to code the samples. Correspondingly, a coding block (CB) may be an M×N block of samples for some values of M and N such that the division of a CTB into coding blocks is a partitioning.

In some embodiments, e.g., according to HEVC, a coding tree unit (CTU) may be split into CUs by using a quad-tree structure denoted as a coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quad-tree structure similar to the coding tree for the CU.

In embodiments, e.g., according to the latest video coding standard currently in development, which is referred to as Versatile Video Coding (VVC), a combined quad-tree and binary-tree (QTBT) partitioning is for example used to partition a coding block. In the QTBT block structure, a CU can have either a square or rectangular shape. For example, a coding tree unit (CTU) is first partitioned by a quad-tree structure. The quad-tree leaf nodes are further partitioned by a binary-tree or ternary (or triple)-tree structure. The partitioning tree leaf nodes are called coding units (CUs), and that partition is used for prediction and transform processing without any further partitioning. This means that the CU, PU and TU have the same block size in the QTBT coding block structure. In parallel, multiple partitions, for example, triple-tree partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (pre-determined) prediction modes. The set of prediction modes may comprise intra-prediction modes and/or inter-prediction modes.

Intra-Prediction

The set of intra-prediction modes may comprise 35 different intra-prediction modes, such as non-directional modes like DC (or mean) mode and planar mode, or directional modes, e.g. as defined in HEVC, or may comprise 67 different intra-prediction modes, such as non-directional modes like DC (or mean) mode and planar mode, or directional modes, e.g. as defined for VVC.

The intra-prediction unit 254 is configured to use reconstructed samples of neighboring blocks of the same current picture to generate an (intra-)prediction block 265 according to an intra-prediction mode from the set of intra-prediction modes.

The intra-prediction unit 254 (or in general the mode selection unit 260) may be further configured to output intra-prediction parameters (or in general information indicative of the selected intra-prediction mode for the block) to the entropy encoding unit 270 in the form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous, at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g.

whether pixel interpolation is applied, such as half/semi-pel and/or quarter-pel interpolation, or not.

In addition to the above prediction modes, skip mode and/or direct mode may be applied.

The inter-prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, such as reconstructed blocks of one or a plurality of previously decoded pictures 231, for motion estimation. By way of example, a video sequence may comprise the current picture and the previously decoded pictures 231, or in other words, the current picture and the previously decoded pictures 231 may be part of or form a sequence of pictures forming a video sequence.

The encoder 20 may be configured to select a reference block from a plurality of reference blocks of the same or different pictures of the plurality of previously decoded pictures and provide a reference picture (or reference picture index) and/or an offset (spatial offset) between the position (x, y coordinates) of the reference block and the position of the current block as inter-prediction parameters to the motion estimation unit. This offset is also called motion vector (MV).

The motion compensation unit may be configured to obtain, e.g. receive, an inter-prediction parameter and to perform inter-prediction based on or using the inter-prediction parameter to obtain an (inter-)prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, a context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter-prediction parameters, intra-prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of the present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile group or tile) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a (line) buffer 316, a loop filter 320, a decoded picture buffer (DBP) 330, a mode application unit 360, an inter-prediction unit 344 and an intra-prediction unit 354. Inter-prediction unit 344 may be or include a motion compensation unit. Video decoder 30 may, in some examples, perform a decoding pass generally reciprocal to the encoding pass described with respect to video encoder 20 of FIG. 2.

As explained with regard to the encoder 20, the inverse quantization unit 210, the inverse transform processing unit 212, the reconstruction unit 214, the (line) buffer 216, the loop filter 220, the decoded picture buffer (DPB) 230, the inter-prediction unit 244 and the intra-prediction unit 254 are also referred to as forming the "built-in decoder" of video encoder 20. Accordingly, the inverse quantization unit 310 may be identical in function to the inverse quantization unit 210, the inverse transform processing unit 312 may be identical in function to the inverse transform processing unit 212, the reconstruction unit 314 may be identical in function to reconstruction unit 214, the (line) buffer 316 may be identical in function to the (line) buffer 216 providing reference samples 317 to the intra-prediction unit 354, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters 366, such as any or all of inter-prediction parameters (e.g. reference picture index and motion vector), intra-prediction parameters (e.g. intra-prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter-prediction parameters, intra-prediction parameters and/or other syntax elements to the mode selection unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general, information related to the inverse quantization) and quantized coefficients from the encoded picture data 21 (e.g. by parsing and/or decoding, e.g. by entropy decoding unit 304) and to apply, based on the quantization parameters, an inverse quantization to the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 313 in the sample domain. The reconstructed residual blocks 313 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filter or a collaborative filter, or any combination thereof. Although the loop filter unit 320 is shown in FIG. 3 as being an in-loop filter, in other configurations, the loop filter unit 320 may be implemented as a post loop filter.

Decoded Picture Buffer

The decoded video blocks 321 of a picture are then stored in the decoded picture buffer 330, which stores the decoded pictures 331 as reference pictures for subsequent motion compensation for other pictures and/or for output or respectively display.

The decoder 30 is configured to output the decoded picture 311, e.g. via output 312, for presentation or viewing to a user.

Prediction

The inter-prediction unit 344 may be identical to the inter-prediction unit 244 (in particular, to the motion compensation unit) and the intra-prediction unit 354 may be identical to the intra-prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode selection unit 360 may be configured to perform the prediction (intra- or inter-prediction) per block based on reconstructed pictures, blocks or respective samples (filtered or unfiltered) to obtain the prediction block 365. Furthermore, reference samples 317 from the line buffer 316 may be used by intra-prediction unit 354.

When the video slice or picture is coded as an intra-coded (I) slice, intra-prediction unit 354 of mode selection unit 360 is configured to generate prediction block 365 for a picture block of the current video slice based on a signaled intra-prediction mode and data from previously decoded blocks of the current picture. When the video slice or picture is coded as an inter-coded (i.e., B, or P) slice, inter-prediction unit 344 (e.g. motion compensation unit) of mode selection unit 360 is configured to produce prediction block 365 for a video block of the current video slice based on the motion vectors and other syntax elements received from entropy decoding unit 304. For inter-prediction, the prediction blocks may be produced from one of the reference pictures within one of the reference picture lists. Video decoder 30 may construct the reference picture lists, List 0 and List 1, using default construction techniques based on reference pictures stored in DPB 330. The same or similar approach may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode selection unit 360 is configured to determine the prediction information for a video/picture block of the current video slice by parsing the motion vectors and other syntax elements, and use the prediction information to produce the prediction block for the current video block being decoded. For example, the mode selection unit 360 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-coded video block of the slice, inter-prediction status for each inter-coded video block of the slice, and other information to decode the video blocks in the current video slice. The same or similar approach may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise one or more blocks (e.g. CTUs) or one or more tiles, wherein each tile may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current operation may be further processed and then output to the next operation. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of the current block (including but not limited to control point motion vectors of affine mode, sub-block motion vectors in affine, planar, ATMVP modes, temporal motion vectors, and so on). For example, the value of a motion vector is constrained to a predefined range according to its representing bit number. If the representing bit number of the motion vector is bitDepth, then the range is $-2^{(bitDepth-1)} \sim 2^{(bitDepth-1)}-1$, where "^" means exponentiation. For example, if bitDepth is set equal to 16, the range is $-32768 \sim 32767$; if bitDepth is set equal to 18, the range is $-131072 \sim 131071$. For example, the value of the derived motion vector (e.g. the MVs of four 4×4 sub-blocks within one 8×8 block) is constrained such that the maximum difference between integer parts of the four 4×4 sub-block MVs is no more than N pixels, such as no more than 1 pixel.

The following description provides two methods for constraining the motion vector according to the bitDepth.

Method 1: remove the overflow MSB (most significant bit) by the following operations:

$$ux = (mvx + 2^{bitDepth}) \% 2^{bitDepth} \qquad (1)$$

$$mvx = (ux >= 2^{bitDepth-1}) \; ? \; (ux - 2^{bitDepth}) : ux \qquad (2)$$

$$uy = (mvy + 2^{bitDepth}) \% 2^{bitDepth} \qquad (3)$$

$$mvy = (uy >= 2^{bitDepth-1}) \; ? \; (uy - 2^{bitDepth}) : uy \qquad (4)$$

where mvx is a horizontal component of a motion vector of an image block or a sub-block, mvy is a vertical component of a motion vector of an image block or a sub-block, and ux and uy indicate respective intermediate values.

For example, if the value of mvx is −32769, after applying formulae (1) and (2), the resulting value is 32767. In a computer system, decimal numbers are stored as two's complements. The two's complement of −32769 is 1,0111, 1111,1111,1111 (17 bits). Then, the MSB is discarded, so the resulting two's complement is 0111, 1111,1111, 1111 (decimal number is 32767), which is the same as the output by applying formulae (1) and (2).

$$ux = (mvpx + mvdx + 2^{bitDepth}) \% 2^{bitDepth} \qquad (5)$$

$$mvx = (ux >= 2^{bitDepth-1}) \; ? \; (ux - 2^{bitDepth}) : ux \qquad (6)$$

$$uy = (mvpy + mvdy + 2^{bitDepth}) \% 2^{bitDepth} \qquad (7)$$

$$mvy = (uy >= 2^{bitDepth-1}) \; ? \; (uy - 2^{bitDepth}) : uy \qquad (8)$$

The operations may be applied during the sum of the motion vector predictor mvp and the motion vector difference mvd, as shown in formulae (5) to (8).

Method 2: remove the overflow MSB by clipping the value:

$$vx = \text{Clip3}(-2^{bitDepth-1}, 2^{bitDepth-1} - 1, vx)$$

$$vy = \text{Clip3}(-2^{bitDepth-1}, 2^{bitDepth-1} - 1, vy)$$

where vx is a horizontal component of a motion vector of an image block or a sub-block, vy is a vertical component of a motion vector of an image block or a sub-block; x, y and z respectively correspond to three input values of the MV clipping process, and the definition of the function Clip3 is as follows:

$$\text{Clip3}(x, y, z) = \begin{cases} x; & z < x \\ y; & z > y \\ z; & \text{otherwise} \end{cases}$$

Figure 4:
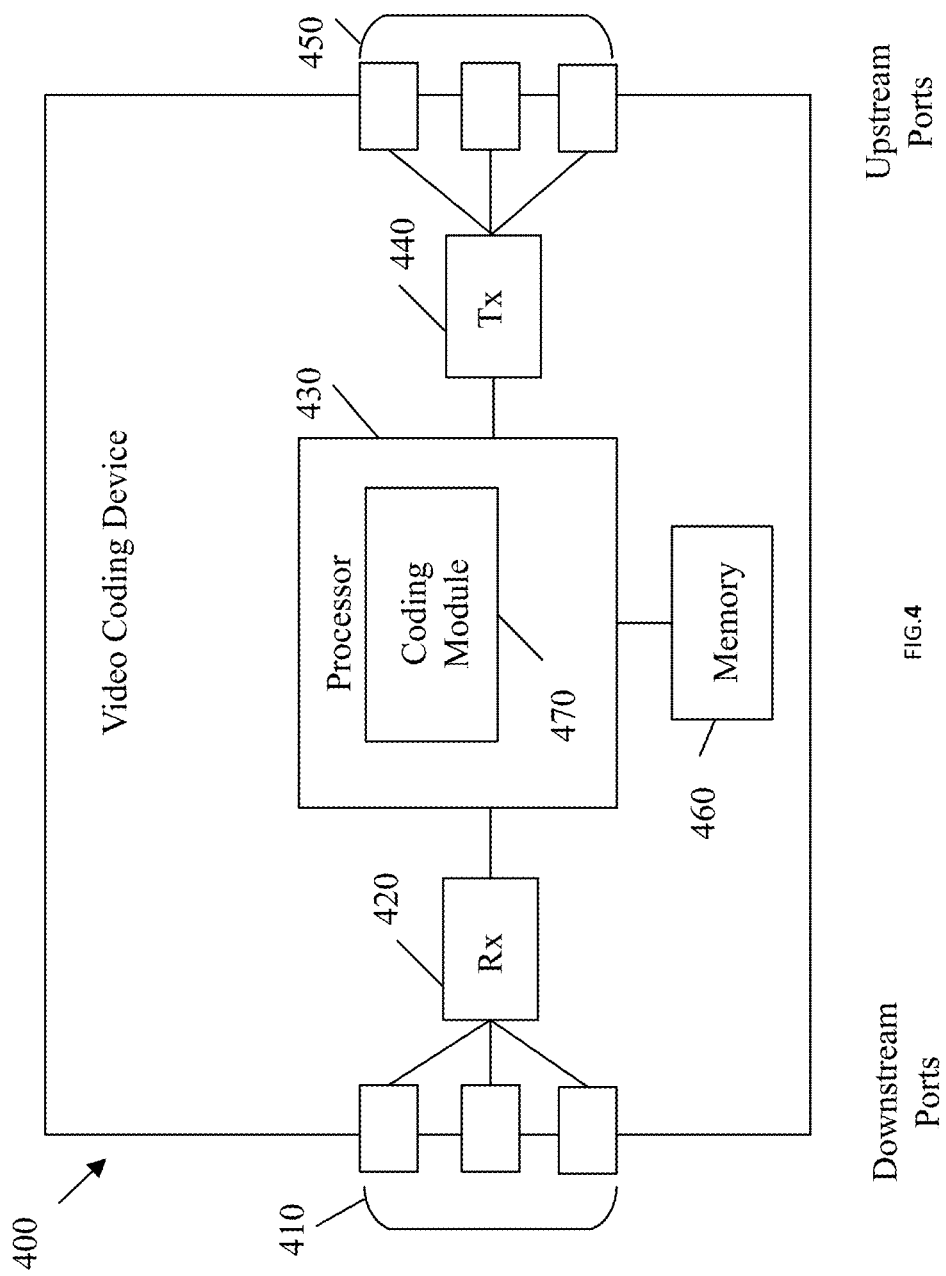
FIG. 4 is a block diagram illustrating an example of an encoding apparatus or a decoding apparatus.

FIG. 4 is a schematic diagram of a video coding device 400 according to an embodiment of the present disclosure. The video coding device 400 is suitable for implementing the disclosed embodiments as described below. In an embodiment, the video coding device 400 may be a decoder such as video decoder 30 of FIG. 1A or an encoder such as video encoder 20 of FIG. 1A.

The video coding device 400 may comprise ingress ports 410 (or input ports 410) and a receiver unit (Rx) 420 for receiving data; a processor, logic unit, or central processing unit (CPU) 430 to process the data; a transmitter unit (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver unit 420, the transmitter unit 440, and the egress ports 450 for egress or ingress of optical or electrical signals.

The processor 430 may be implemented by hardware and software. The processor 430 may be implemented as one or more CPU chips, cores (e.g., as a multi-core processor), FPGAs, ASICs, and DSPs. The processor 430 may be in communication with the ingress ports 410, the receiver unit 420, the transmitter unit 440, egress ports 450, and the memory 460. The processor 430 may comprise a coding module 470. The coding module 470 implements the disclosed embodiments described above and below. For instance, the coding module 470 may implement, process, prepare, or provide the various coding operations. The inclusion of the coding module 470 therefore provides a substantial improvement to the functionality of the video coding device 400 and effects a transformation of the video coding device 400 to a different state. Alternatively, the coding module 470 may be implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or nonvolatile and may be a read-only memory (ROM), random access memory (RAM), ternary content-addressable memory (TCAM), and/or static random-access memory (SRAM).

Figure 5:
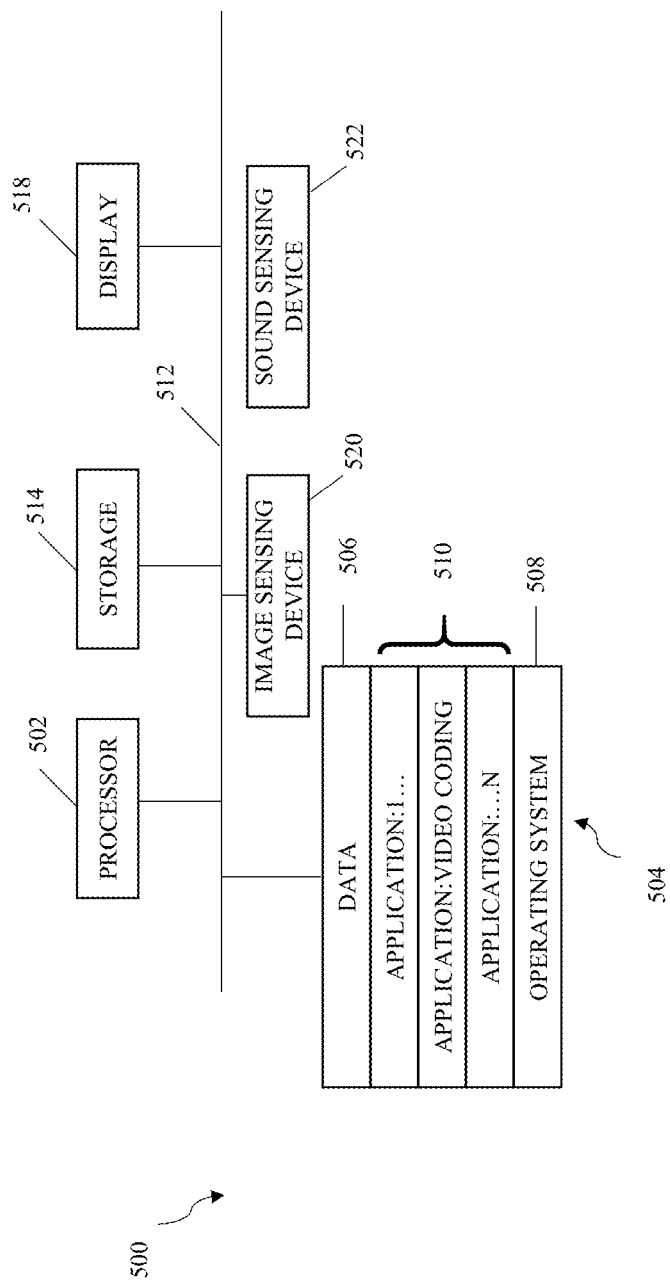
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1A according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described herein. For example, the application programs 510 can include applications 1 through N, which further include a video coding application that performs the methods described herein.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, a secondary storage 514 can be directly coupled to the other components of the apparatus 500 or can be accessed via a network and can comprise a single integrated unit such as a memory card or multiple units such as multiple memory cards. Furthermore, an image sensing device 520 and/or a sound sensing device 522 may be included in the apparatus 500. The apparatus 500 can thus be implemented in a wide variety of configurations.

Combined Inter-Intra Prediction (CIIP)

Conventionally, a coding unit is either intra-predicted (using the reference samples in the same picture) or interpredicted (using the reference samples in other pictures). The combined inter-intra prediction combines these two prediction approaches. Therefore, it is sometimes also called multi-hypothesis (MH) prediction. When combined inter-intra prediction is enabled, the intra-predicted and inter-predicted samples are applied by weights, and the final prediction is thus derived as the weighted average of the predicted samples.

A flag, the CIIP flag, is used to indicate when a block is coded with combined inter-intra prediction.

Figure 6:
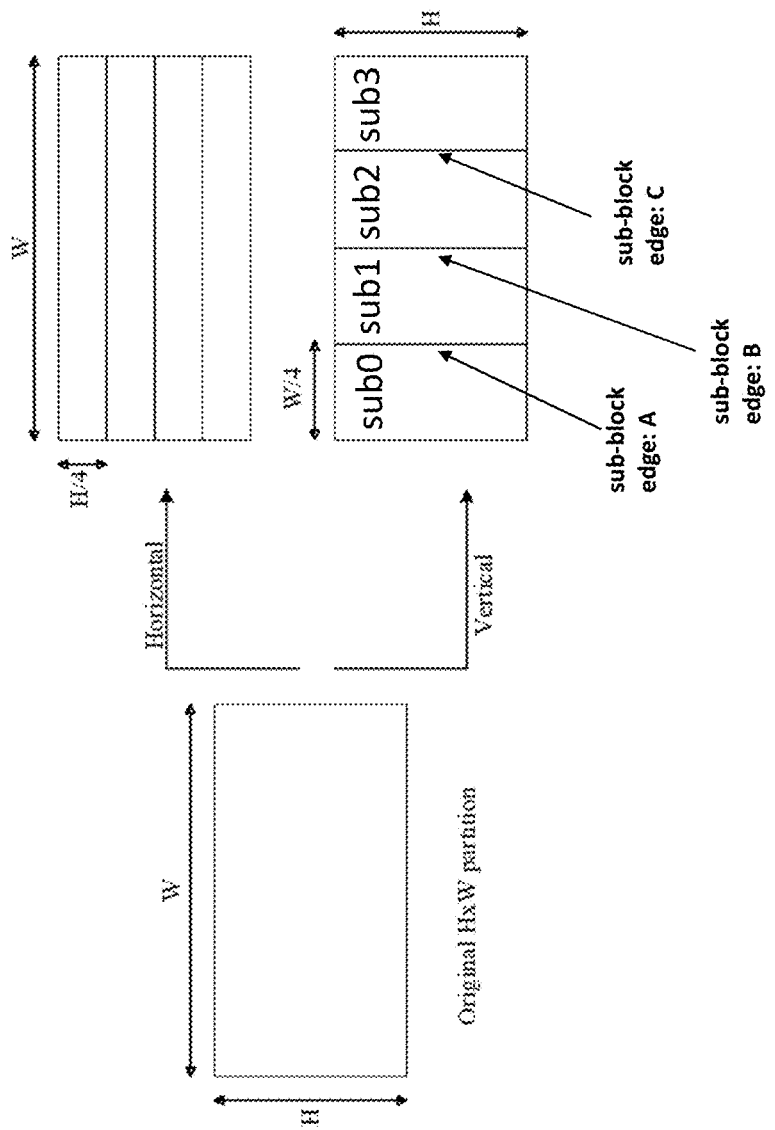
FIG. 6 is a diagram showing exemplary sub-block boundaries of a coding unit.
Figure 7:
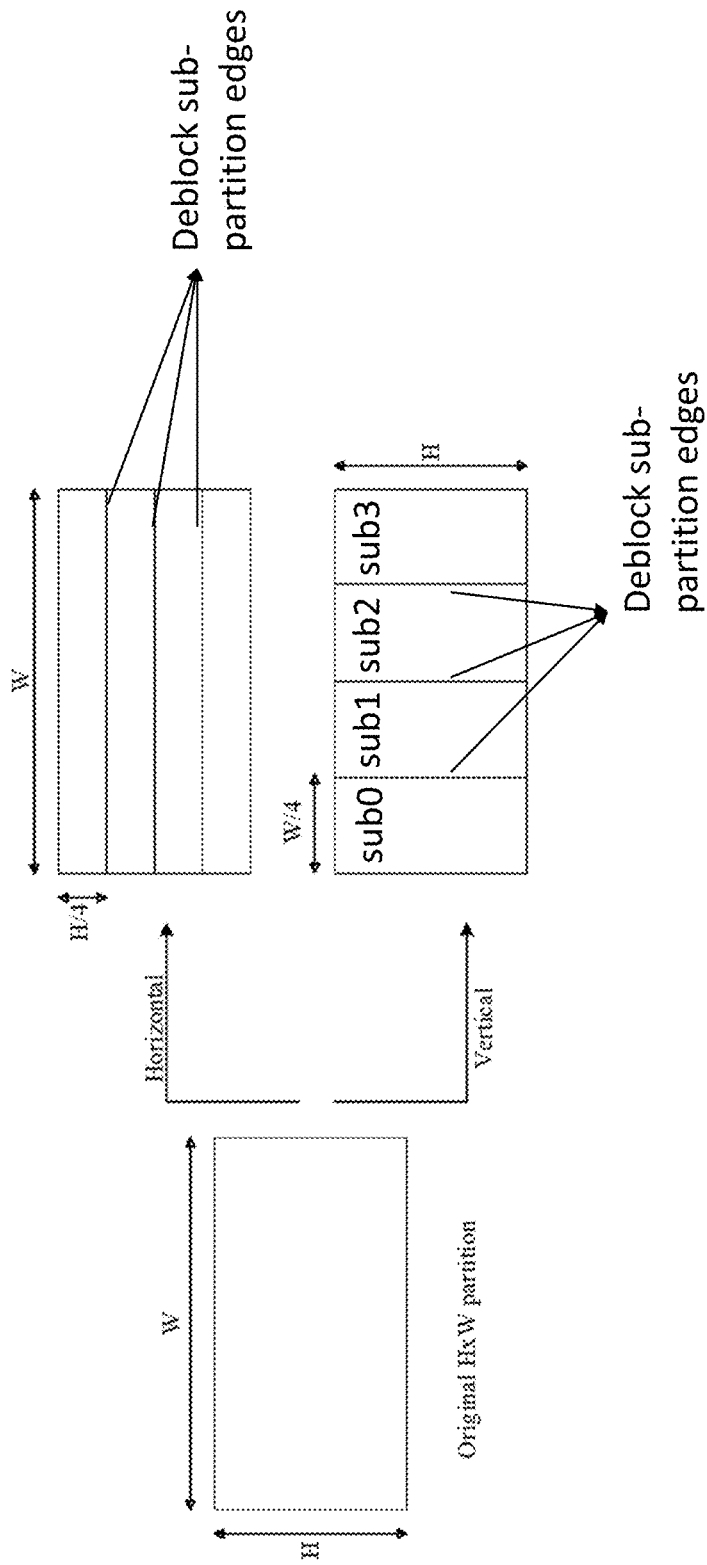
FIG. 7 is another diagram showing exemplary sub-block boundaries of a coding unit.

A block coded with CIIP may be further divided into several sub-blocks, as shown in FIGS. 6 and 7. In one example, the sub-blocks are derived by dividing the block into horizontal sub-blocks, i.e. by dividing in the vertical direction, with each sub-block having the same width as the original block but only ¼ height of the original block.

In one example, the sub-blocks are derived by dividing the block into vertical sub-blocks, i.e. by dividing in the horizontal direction, with each sub-block having the same height as the original block but only ¼ width of the original block.

Block artifacts may be introduced due to CIIP, as CIIP involves results with intra-prediction which usually has more residual signals. The block artifacts not only occur at boundaries of a CIIP block, but also at the sub-block edges inside the CIIP block, such as the vertical sub-block edges A, B, C in FIG. 6. The horizontal sub-block edges can be identified correspondingly. To remove block artifacts, the sub-block edges inside the CIIP block may be deblocked as shown in FIG. 7.

Although block artifacts can occur at both CIIP block boundaries and sub-block edges inside CIIP blocks, the distortion caused by these two boundaries may be different, and different boundary strengths may be needed.

The sub-block edges may be caused by the CIIP itself. For example, if the intra-prediction mode of a CIIP block is a horizontal mode, vertical partitioning as shown in FIG. 6 is applied, resulting in three sub-block edges.

Figure 8:
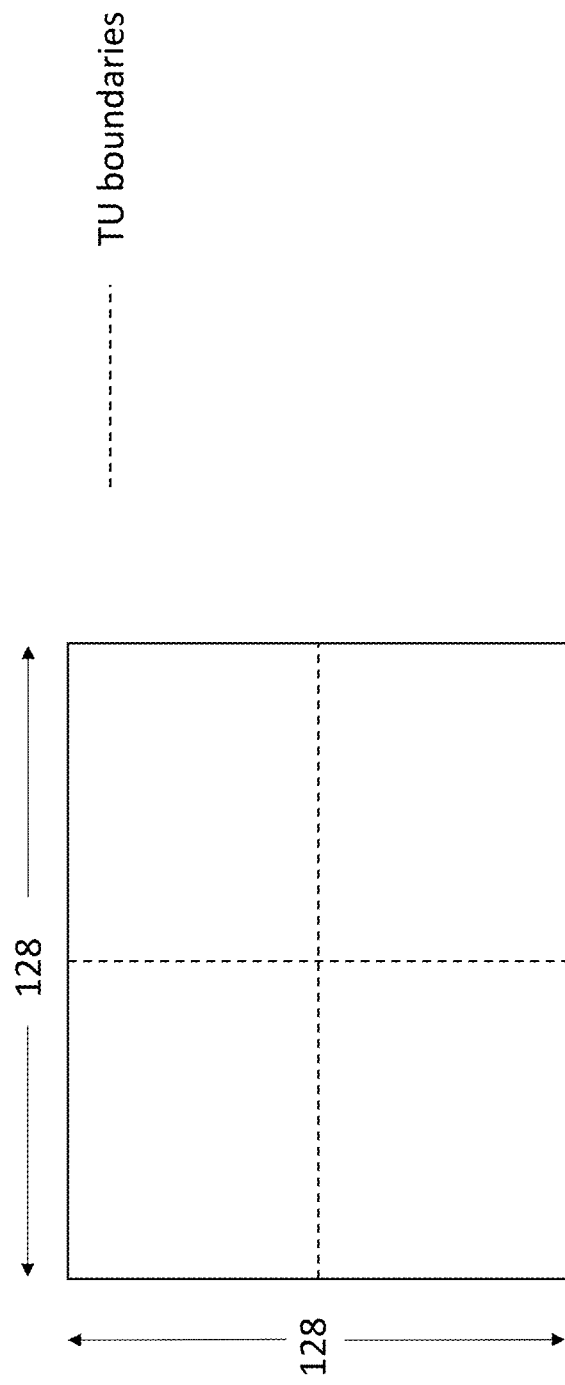
FIG. 8 is a diagram showing a division of a coding unit into four transform units.

However, the sub-block edges may also be caused by TU (transform unit) size limitations. In VTM3.0 (Versatile Video Coding Test Model 3.0), the largest TU size is 64×64 samples. If a CU (coding unit) is 128×128 samples, then it will be divided into 4 TUs, resulting in 4 TU boundaries, as shown in FIG. 8. Consequently, the transform is applied at 64×64 granularity. TU boundaries shown as dashed lines need to be deblocked.

Figure 9:
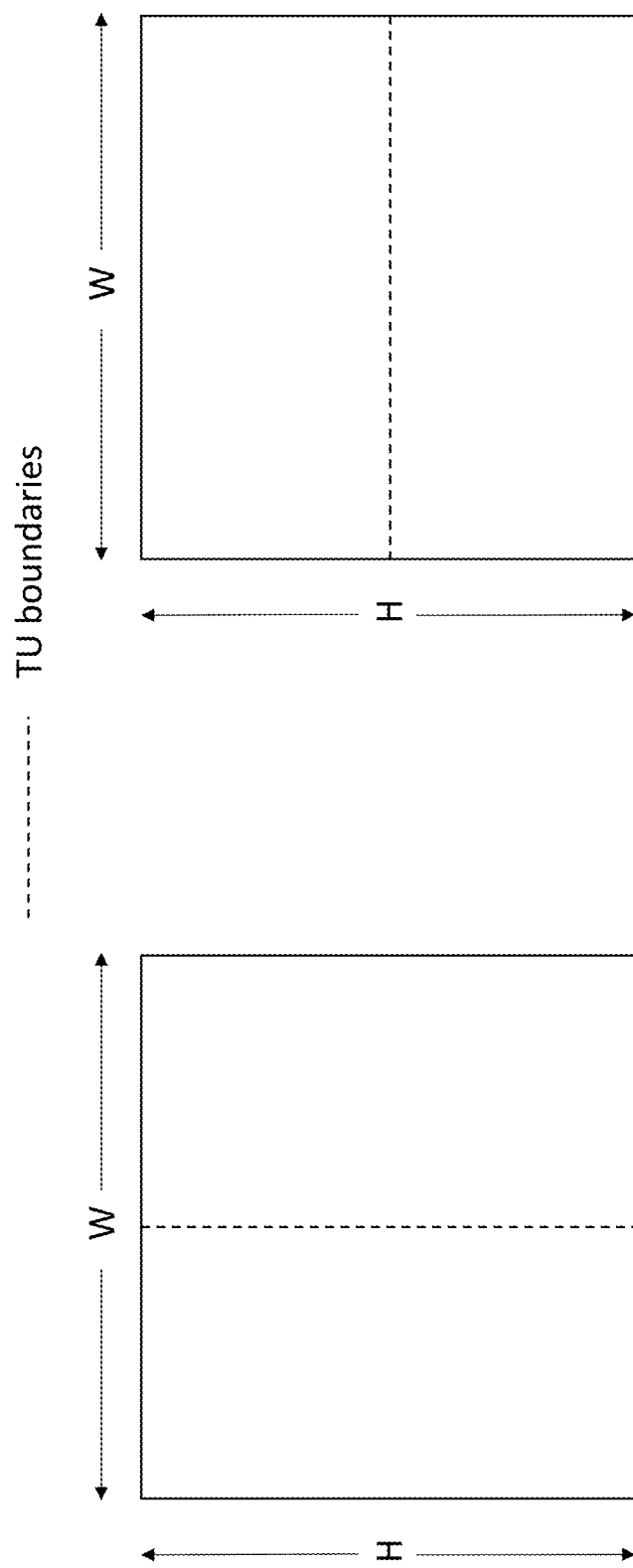
FIG. 9 is a diagram showing a division of a CIIP block into multiple transform units.

Furthermore, when a particular coding tool (e.g. a sub-block transform) is applied, TU edges can occur inside a CU processed by the prediction of CIIP, such as shown in FIG. 9. A coding unit coded with CIIP may be further divided into multiple transform units. The TU boundaries highlighted as dashed lines in FIG. 9 thus represent internal TU edges inside a CIIP unit. These internal TU edges inside the CIIP unit also need to be deblocked.

In the rest of the description, the following terminology is used:

CIIP blocks: The coding blocks that are predicted by application of CIIP.

Intra blocks: The coding blocks that are predicted by application of intra prediction but not CIIP.

Inter blocks: The coding blocks that are predicted by application of inter prediction but not CIIP.

Deblocking Filter and Boundary Strength

Video coding schemes such as HEVC and VVC are designed along the successful principle of block-based hybrid video coding. Using this principle, a picture is first partitioned into blocks and then each block is predicted by using intra-picture or inter-picture prediction. These blocks are coded with respect to the neighboring blocks and approximate the original signal with some degree of similarity. Since coded blocks only approximate the original signal, the difference between the approximations may cause discontinuities at the prediction and transform block boundaries. These discontinuities are attenuated by the deblocking filter.

Figure 10:
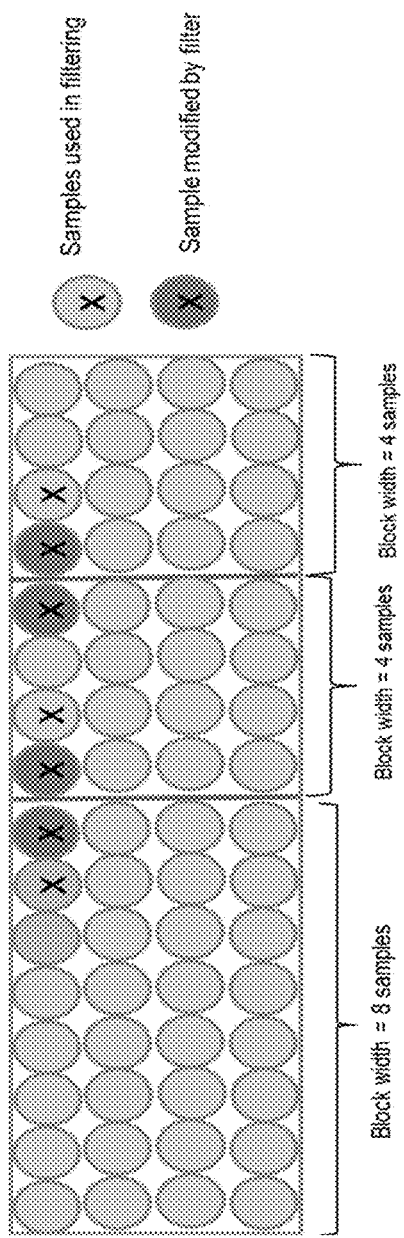
FIG. 10 shows an example for the application of a deblocking filter on the samples of a sub-partition.

FIG. 10 shows an example for the application of a deblocking filter on the samples of a sub-partition. If the size of the sub-partition is smaller than 8 samples orthogonally to the direction of the deblocking, a weak filer that only uses 3 samples in the decision process and modifies one sample is used.

A decision whether to filter a block boundary uses the bitstream information such as prediction modes and motion vectors. Some coding conditions are more likely to create strong block artifacts, which are represented by a so-called boundary strength (Bs or BS) variable that is assigned to every block boundary and is determined as in Table 1.

TABLE 1

| Conditions | Bs |
| --- | --- |
| At least one of the adjacent blocks is intra | 2 |
| At least one of the adjacent blocks has non-zero transform coefficients | 1 |
| Absolute difference between the vertical or horizontal component of the motion vectors that belong to the adjacent blocks is greater than or equal to one integer luma sample | 1 |
| Motion prediction in the adjacent blocks refers to different reference pictures or number of motion vectors is different | 1 |
| Otherwise | 0 |

The deblocking is only applied to the block boundaries with Bs greater than zero for a luma component and Bs greater than 1 for chroma components. Higher values of Bs enable stronger filtering by using higher clipping parameter values. The Bs derivation conditions reflect the probability that the strongest block artifacts appear at the intra-predicted block boundaries.

Figure 11:
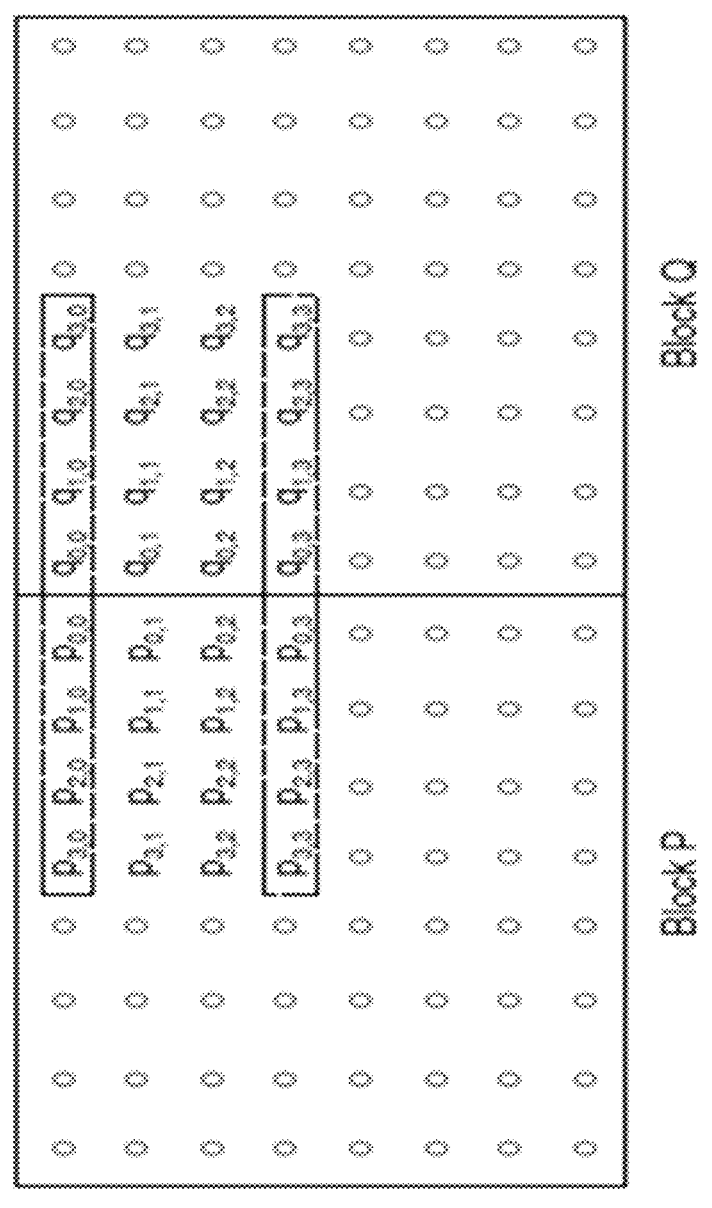

Usually, the two adjacent blocks of a boundary are labeled as P and Q, as shown in FIG. 11. The figure depicts the case of a vertical boundary. If a horizontal boundary is considered, then FIG. 11 shall be rotated 90 degrees clockwise, where P would be the upper block and Q the lower block.

Most Probable Mode List Construction

Most Probable Mode (MPM) list is used in intra mode coding to improve coding efficiency. Due to the large number of intra modes (e.g. 35 in HEVC and 67 in VVC), the intra mode of the current block is not signaled directly. Instead, a Most Probable Mode list of the current block is constructed based on its neighboring blocks' intra-prediction modes. As an intra mode of a current block is relevant for its neighbors, the MPM list usually provides a good prediction as its name (Most Probable Mode list) indicates. Thus, the intra mode of the current block has a high chance of falling into its MPM list. In this way, to derive the intra mode of the current block, only the index of the MPM list is signaled. Compared to the number of total intra modes, the length of the MPM list is much smaller (e.g. a 3-MPM list is used in HEVC and a 6-MPM list is used in VVC). Therefore, fewer bits are required to code the intra mode. A flag (mpm_flag) is used to indicate whether the intra mode of the current block belongs to its MPM list or not. If it is true, the intra mode of the current block can be indexed using the MPM list. Otherwise, the intra mode is directly signaled using a binarized code. In both VVC and HEVC, the MPM list is constructed based on its neighboring left and top blocks. When the left neighbor block and the top neighbor block of the current block are unavailable for prediction, a default mode list is used.

Motion Vector Prediction

Motion Vector Prediction is a technique used in motion data coding. A Motion Vector usually has two components, x and y, referring to the motion in the horizontal and vertical direction, respectively. Motion vectors of the current block are usually correlated with the motion vectors of neighboring blocks in the current picture or in the earlier coded pictures. This is because neighboring blocks are likely to correspond to the same moving object with similar motion and the motion of the object is not likely to change abruptly over time. Consequently, using the motion vectors in neighboring blocks as predictors reduces the size of the signaled motion vector difference. The Motion Vector Predictors (MVPs) are usually derived from already decoded motion vectors from spatially neighboring blocks and/or from temporally neighboring blocks in the co-located picture.

If a block is determined to be predicted by the application of CIIP, its final predicted samples are partially based on the intra-predicted samples. Since intra-prediction is also involved, generally the residual and transform coefficients are larger when compared to the inter blocks (mvd, merge, skip). Therefore, when these multi-hypothesis (MH or MHIntra) blocks, i.e. CIIP blocks, are adjacent to other blocks, then across the boundary there will be more discontinuities. In HEVC and VVC, when any of the two adjacent blocks of a boundary is intra-predicted, a strong deblocking filter is applied for this boundary, wherein the parameter of Boundary Strength (BS) is set to 2 (the strongest).

In VTM3.0, however, the potential block artifact caused by blocks predicted by CIIP is not considered. The boundary strength derivation still considers the blocks with CIIP as inter blocks. Under certain circumstances, such a processing approach may cause inferior subjective and objective quality.

The embodiments of this disclosure provide several alternatives to incorporate CIIP blocks in order to improve the deblocking filter, wherein the boundary strength derivation of a particular boundary is impacted by CIIP blocks.

A reference document for Versatile Video Coding (Draft 3) is defined as VVC Draft 3.0, and can be found via the following link:
  http://phenix.it-sudparis.eu/jvet/doc_end_user/documents/12_Macao/wg11/JVET-L1001-v3.zip.

Embodiment 1

Figure 12:
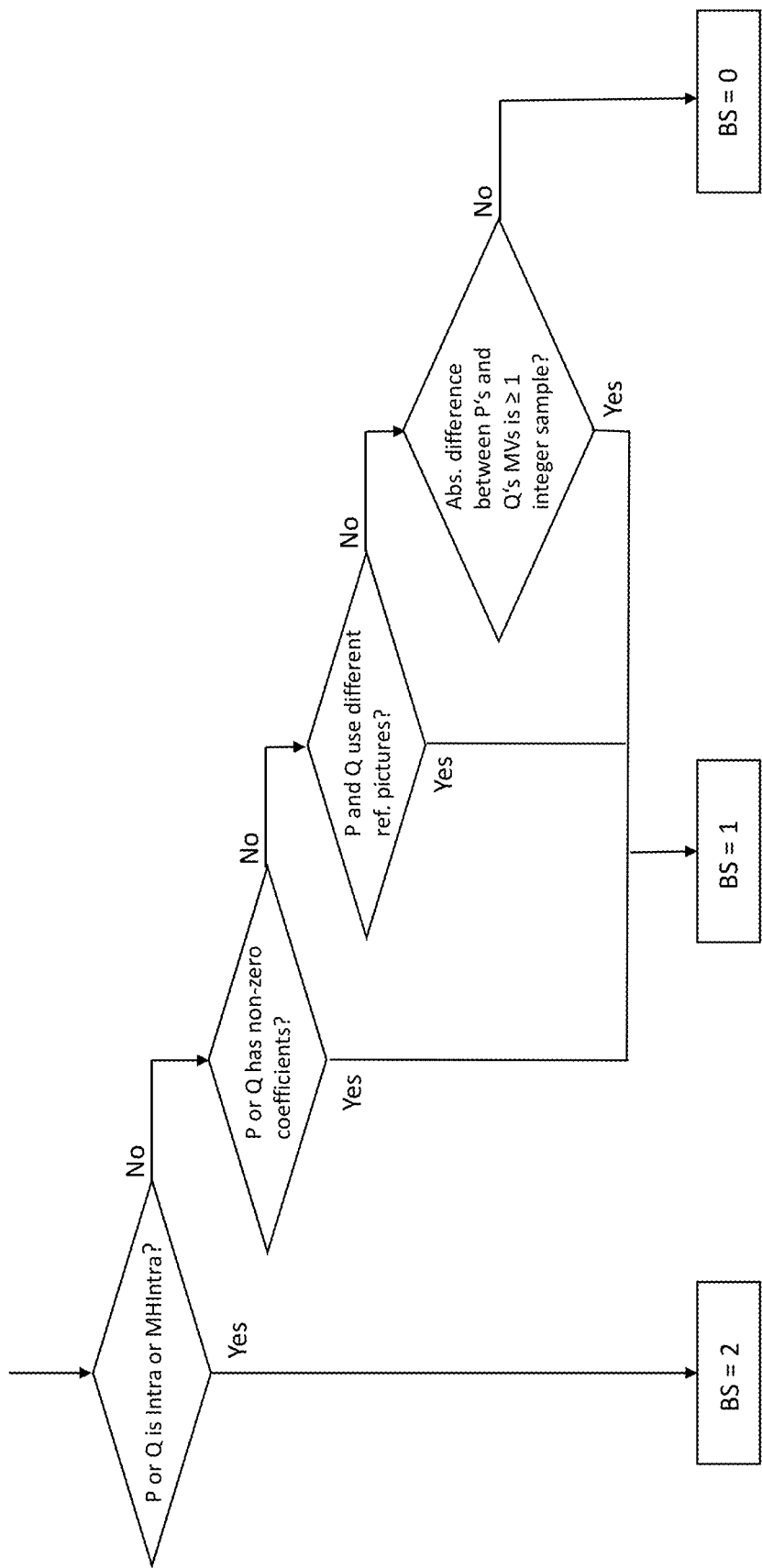
FIG. 12 is a flowchart showing the derivation of the boundary strength of a boundary according to an embodiment of the present disclosure.

For a boundary with two sides, (where the spatially adjacent blocks on each side are denoted as P block and Q block), the boundary strength may be determined as follows:
  As shown in FIG. 12, if at least one block of the P and Q blocks is a block with CIIP (MHIntra prediction), then the boundary strength parameter of this boundary is set to a first value. For example, the first value may be equal to 2.
  If neither the P nor the Q block is predicted by application of CIIP and if at least one of the P and Q blocks is predicted by application of intra-prediction, the boundary strength is determined to be equal to 2.
  If neither the P nor the Q block is predicted by application of CIIP and if both, the P block and the Q block are predicted by application of inter-prediction, then the boundary strength is determined to be smaller than 2. The exact value of the boundary strength is determined according to further conditional evaluations. The derivation of the boundary strength of this boundary is shown in FIG. 12 and follows the specification in Table 1.
  More specifically, if at least one of the P and Q blocks has non-zero transform coefficients, the boundary strength is determined to be equal to 1. Likewise, if the inter-prediction of the P and Q blocks uses different reference pictures or the number of motion vectors for the P and Q blocks is different, the boundary strength is determined to be equal to 1. Furthermore, if the absolute difference between the motion vectors of the P and Q blocks is greater than or equal to one integer luma sample for at least one of the horizontal components and the vertical components of the motion vectors, the boundary strength is determined to be equal to 1.

Figure 13:
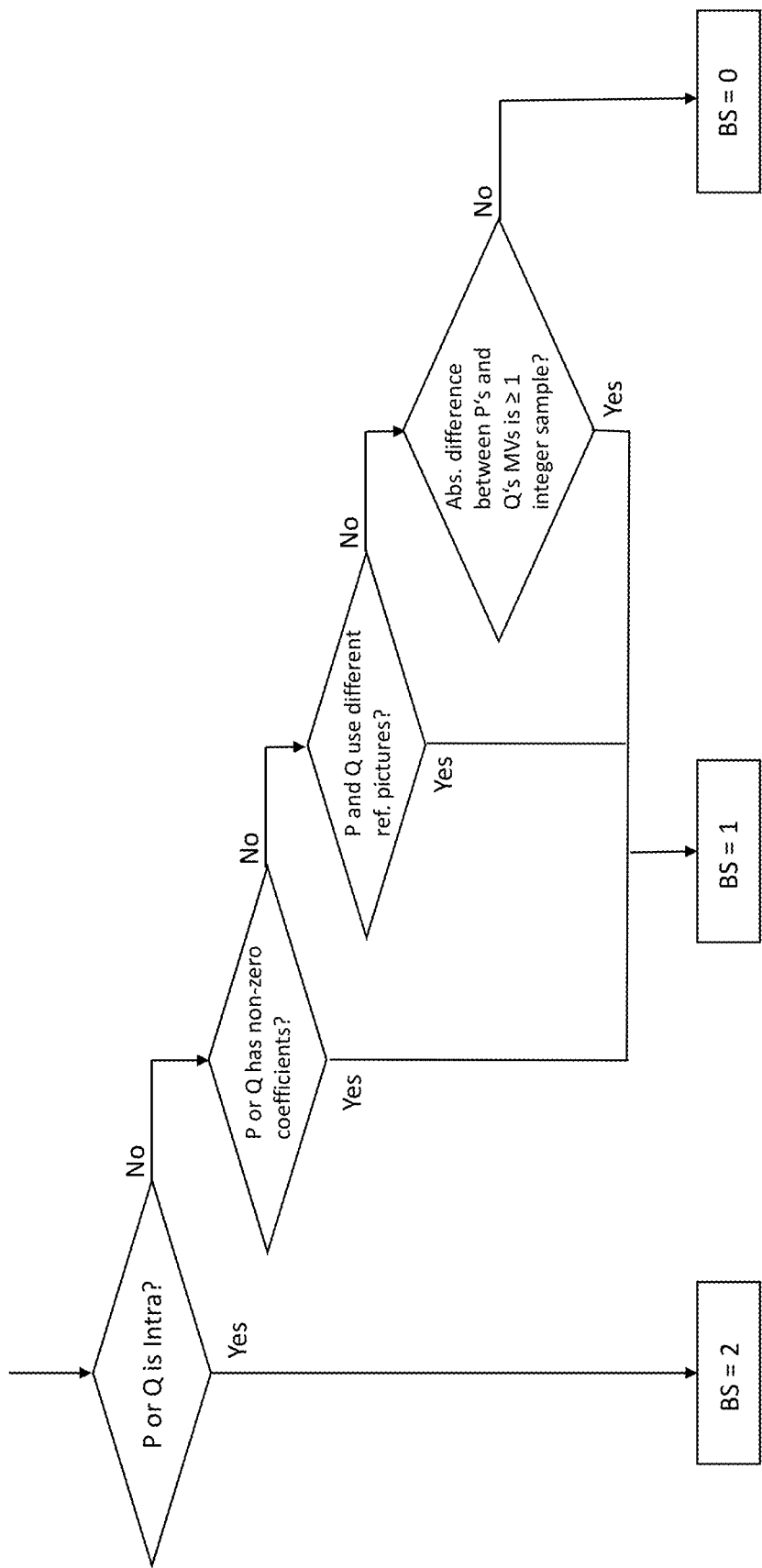
FIG. 13 is a flowchart showing the derivation of the boundary strength of a boundary according to the prior art.

For comparison, a method specified in the VVC or ITU-H.265 video coding standard is shown in FIG. 13. The determination of the boundary strength according to the present embodiments for the case that neither the P block nor the Q block is predicted by application of CIIP corresponds to the known method of FIG. 13.

The pixel samples comprised in the P and Q blocks are filtered by application of a deblocking filter according to the determined boundary strength as mentioned above.

Embodiment 2

Figure 14:
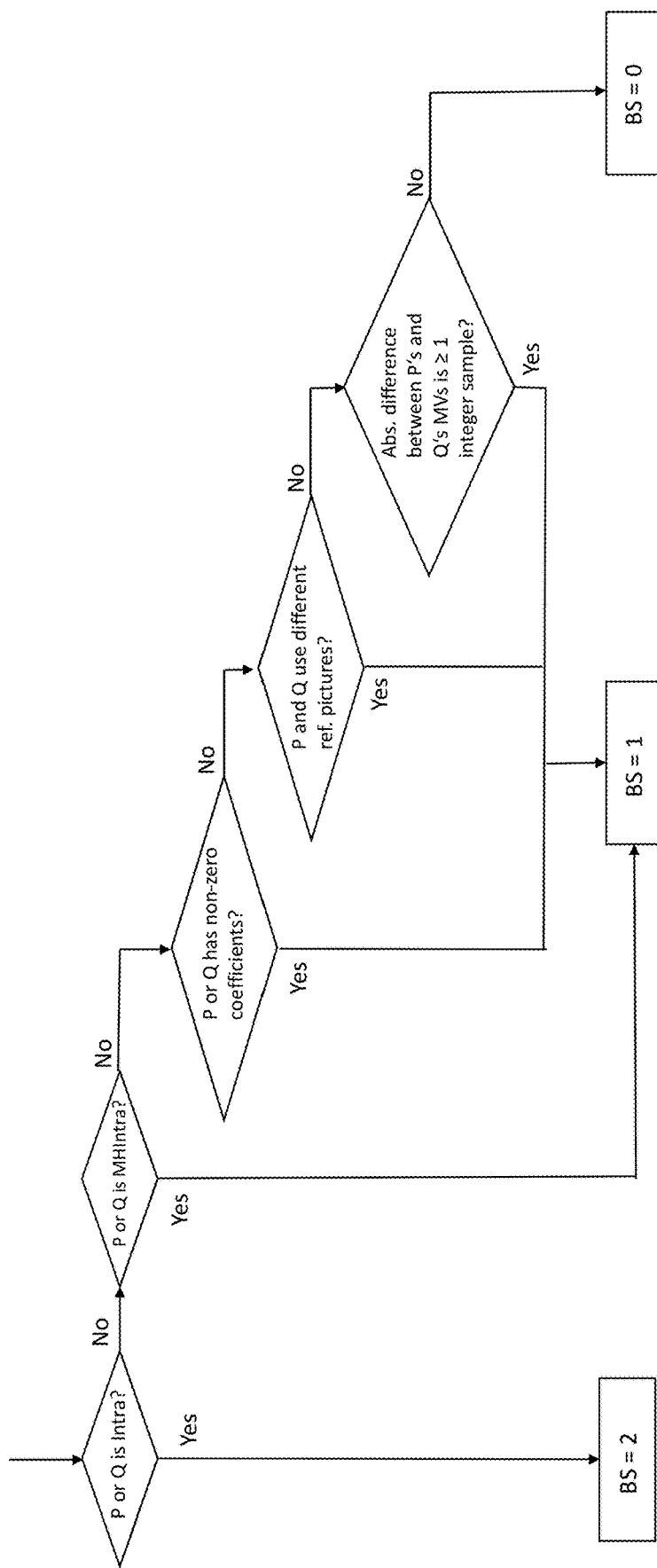
FIG. 14 is a flowchart showing the derivation of the boundary strength of a boundary according to another embodiment of the present disclosure.

As shown in FIG. 14, for a boundary with two sides (where the spatially adjacent blocks on each side are denoted as P block and Q block), the boundary strength may alternatively be derived as follows:
  If at least one block of the P and Q blocks is a block with intra-prediction, then the boundary strength is set to 2.
  Otherwise, if at least one block of the P and Q blocks is a block with CIIP (MHIntra prediction), then the boundary strength of this boundary is set to a first value, for example, 1.
  Otherwise, if at least one of the P and Q blocks has non-zero transform coefficients, then the boundary strength of this boundary is set to a second value, for example, 1. The first and the second value may be different.
  Otherwise, if an absolute difference between the motion vectors that belong to the P and Q blocks is greater than or equal to one integer luma sample, then the boundary strength of this boundary is set to the second value, for example, 1.
  Otherwise, if motion prediction in the adjacent blocks refers to different reference pictures or the number of motion vectors is different, then the boundary strength of this boundary is set to the second value, for example 1.
  Otherwise, the boundary strength of this boundary is set to 0.

The pixel samples comprised in the P and Q blocks are filtered by application of a deblocking filter according to the determined boundary strength.

Embodiment 3

Figure 15:
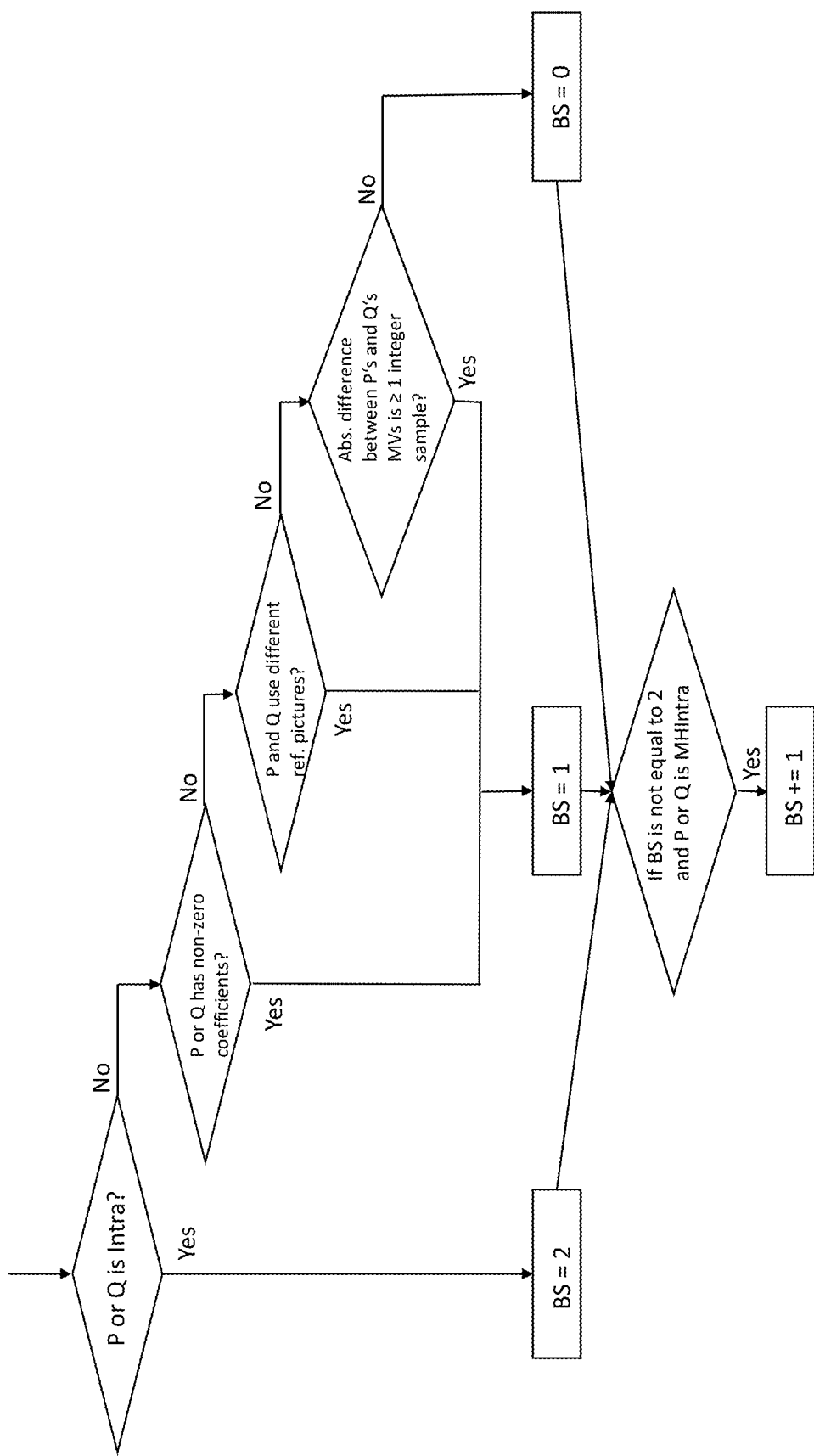
FIG. 15 is a flowchart showing the derivation of the boundary strength of a boundary according to yet another embodiment of the present disclosure.

As shown in FIG. 15, for a boundary with two sides (where the spatially adjacent blocks on each side are denoted as P block and Q block), the boundary strength of this boundary may alternatively be set as follows:
  If at least one block of the P and Q blocks is predicted by application of intra-prediction and not by application of CIIP, then the boundary strength is set equal to 2. Possibilities include the P block being predicted by intra-prediction and not by multi-hypothesis (MH or MHIntra), i.e. CIIP, prediction and the Q block being predicted by any prediction function, and vice versa.

If the P and Q blocks are predicted by the application of inter-prediction or by the application of CIIP (Possibilities include the P block being an inter block and the Q block being an inter block, or alternatively the P block being an inter block and the Q block being a CIIP block, or alternatively the P block being a CIIP block and the Q block being an inter block, or alternatively the P block being a CIIP block and the Q block being a CIIP block), the following may apply:
  If at least one of the P and Q blocks has non-zero transform coefficients, then the boundary strength parameter of the boundary is set equal to 1.
  Otherwise (if the P and Q blocks have no non-zero transform coefficients), if the P and Q blocks are predicted on the basis of different reference pictures or the number of motion vectors that are used to predict block P and block Q are not equal, then the boundary strength of this boundary is set equal to 1.
  Otherwise (if the P and Q blocks have no non-zero transform coefficients and the P and Q blocks are predicted on the basis of the same reference picture(s) and the number of motion vectors that are used to predict the P and Q blocks is the same), if the absolute difference between the motion vectors that are used to predict the P and Q blocks is greater than or equal to one integer luma sample, then the boundary strength of this boundary is set equal to 1.
  Otherwise (if the above 3 conditions are all evaluated to be false), the boundary strength of this boundary is set equal to 0.
Subsequently, if at least one block of the P and Q blocks is a block with CIIP, then the boundary strength is modified as follows:
  If the boundary strength is not equal to a predefined first value (in one example, the predefined first value is equal to 2), then the boundary strength is incremented by a predefined second value (in one example, the predefined second value is equal to 1).
The pixel samples comprised in the P and Q blocks are filtered by application of a deblocking filter according to the determined boundary strength.

Embodiment 4

For a boundary with two sides (P and Q, as described in VVC Draft 3.0 according to the above-mentioned reference), the boundary strength may be derived as follows:
  If this boundary is a horizontal boundary and P and Q belong to different CTUs, then:
    If block Q is a block with CIIP, then the boundary strength is set to 2.
    Otherwise, the boundary strength is derived as defined in VVC Draft 3.0 according to the above-mentioned reference and as shown in FIG. 13
  Otherwise:
    If at least one block of the P and Q blocks is a block with CIIP, then the boundary strength of this boundary is set to 2.
    Otherwise, derive boundary strength of this boundary as defined in VVC Draft 3.0 according to the above-mentioned reference and as shown in FIG. 13

Embodiment 5

For a boundary with two sides (where the spatially adjacent blocks on each side are denoted as P block and Q block), the boundary strength may be determined according to this embodiment as follows:

If at least one of the P block or Q block is predicted by application of intra-prediction and not by the application of CIIP, then the boundary strength is set equal to 2. Possibilities include the P block being predicted by intra-prediction and not by multi-hypothesis (CIIP) prediction and the Q block being predicted by any prediction function, and vice versa.

If the P and Q blocks are predicted by application of inter-prediction or CIIP (Possibilities include the P block being an inter block and the Q block being an inter block, or alternatively the P block being an inter block and the Q block being a CIIP block, or alternatively the P block being a CIIP block and the Q block being an inter block, or alternatively the P block being a CIIP block and the Q block being a CIIP block), the following may apply:

If the boundary is a horizontal boundary and P and Q are located in two different CTUs, then:

If the Q block (where the Q block is denoted as the block that is located below the P block) is predicted by application of CIIP, then the boundary strength of the boundary is set equal to 1.

Otherwise (if the Q block is not predicted by application of CIIP), if at least one of the adjacent blocks P and Q has non-zero transform coefficients, then the boundary strength of the boundary is set equal to 1.

Otherwise, if the absolute difference between the motion vectors that are used to predict the P and Q blocks is greater than or equal to one integer luma sample, then the boundary strength of the boundary is set equal to 1.

Otherwise, if motion compensated prediction in the adjacent blocks P and Q is performed on the basis of different reference pictures or if the number of motion vectors that are used to predict blocks P and Q is not equal, then the boundary strength of the boundary is set equal to 1. The order of these last two conditions may be inverted as shown in FIG. 13.

Otherwise, the boundary strength of the boundary is set equal to 0.

Otherwise (if the boundary is a vertical boundary or if block P and block Q are comprised inside the same CTU):

If at least one of the P and Q blocks is predicted by application of CIIP, then the boundary strength of the boundary is set equal to 1.

Otherwise, if at least one of the adjacent blocks P and Q has non-zero transform coefficients, then the boundary strength of the said boundary is set equal to 1.

Otherwise, if the absolute difference between the motion vectors that are used to predict the blocks P and Q is greater than or equal to one integer luma sample, then the boundary strength of the boundary is set equal to 1.

Otherwise, if motion compensated prediction in the adjacent blocks P and Q is performed on the basis of different reference pictures or if the number of motion vectors that are used to predict blocks P and Q is not equal, then the boundary strength of the boundary is set equal to 1. The order of these last two conditions may be inverted as shown in FIG. 13.

Otherwise, the boundary strength of this boundary is set equal to 0.

The pixel samples comprised in block P and block Q are filtered by application of a deblocking filter according to the determined boundary strength.

Benefit of the Embodiment

Deblocking filtering of blocks that are predicted by application of multi-hypothesis prediction, i.e. CIIP, is applied with a deblocking filter with medium strength (boundary strength equal to 1).

If a block is predicted by application of CIIP, a first prediction is obtained by application of inter-prediction and a second prediction is obtained by application of intra-prediction, which are later combined. Since the final prediction includes an intra-prediction part, it is possible that there are block artifacts at the boundaries of a block that is predicted by CIIP. In order to mitigate this problem, the boundary strength is set to 1 according to the disclosure to guarantee filtering of block edges that are predicted by application of CIIP.

Furthermore the disclosure reduces the required line memory as follows. The line memory is defined as the memory necessary to store the information corresponding to a top CTU row and that is needed during the processing of a neighboring bottom CTU row. For example, in order to filter the horizontal boundary between two CTU rows, the prediction mode information (intra-prediction/inter-prediction/multi-hypothesis (CIIP) prediction) of the top CTU row needs to be stored in the line memory. Since 3 states (intra-prediction/inter-prediction/multi-hypothesis (CIIP) prediction) are possible to describe the prediction mode of a block, the line memory requirement can be defined as 2 bits per block.

According to the disclosure however, if a block (P block in the embodiments) belongs to a top CTU row, the deblocking operation only requires the information about whether the block is predicted by inter-prediction or intra-prediction (therefore only 2 states, which can be stored using one bit per block).

The reason is as follows:

If a boundary between the P block and the Q block is a horizontal boundary, and if the Q block and the P block belong to 2 different CTUs (the Q block is the one at the bottom with respect to the P block in all embodiments), then the information whether the P block is predicted by application of CIIP is not utilized in determination of the boundary strength. It is sufficient to determine whether the P block is predicted by intra-prediction to check the first condition of the above-described embodiment 5 as intra-prediction and CIIP are mutually exclusive. Therefore, it is not necessary to store any information whether the P block is predicted by application of CIIP.

With the help of the disclosure in a hardware implementation the prediction mode of the P block can be temporarily changed to inter-prediction (when the P block is predicted by CIIP), and the boundary strength determination can be performed according to the changed prediction mode. Afterwards (after the determination of the boundary strength), the prediction mode can be changed back to CIIP. It is noted that hardware implementations are not limited to the method described herein (changing the prediction mode of the P block at the CTU boundary). It is just presented as an example to explain that, according to the disclosure, the information of whether the P block is predicted by CIIP is not necessary in the boundary strength determination (at the horizontal CTU boundaries).

Therefore according to the disclosure, the required line memory is reduced from 2 bits per block to 1 bit per block. It is noted that the total line memory that has to be implemented in hardware is proportional to the picture width and inversely proportional to the minimum block width.

Embodiment 6

For a boundary with two sides (where the spatially adjacent blocks on each side are denoted as P block and Q block), the boundary strength may be determined according to this embodiment as follows:
First determine the boundary strength of the boundary according to a method specified in the VVC Draft 3.0 according to the above-mentioned reference as shown in FIG. 13 or the ITU-H.265 video coding standard.
If the boundary is a horizontal boundary and P and Q are located in two different CTUs, then:
  If block Q is predicted by application of CIIP, then the boundary strength is modified as follows:
    If the boundary strength is not equal to 2, then the boundary strength is incremented by 1.
Otherwise (if the boundary is a vertical boundary or if block P and block Q are comprised inside the same CTU):
  If at least one of block P or block Q is predicted by application of CIIP, then the boundary strength of the boundary is adjusted as follows:
    If the boundary strength is not equal to 2, then the boundary strength is incremented by 1.
The pixel samples comprised in block P and block Q are filtered by application of a deblocking filter according to the determined boundary strength.

Embodiment 7

This embodiment represents a variation of embodiment 4.
For a boundary with two sides (where the spatially adjacent blocks on each side are denoted as P block and Q block), the boundary strength may be derived according to this embodiment as follows:
If the boundary is a horizontal boundary and blocks P and Q are located in different CTUs, then:
  If the Q block (where the Q block is denoted as the block that is located below the P block) is predicted by application of CIIP, then the boundary strength is set equal to 2.
  If the Q block is not predicted by application of CIIP and if at least one of the P block or Q block is predicted by application of intra-prediction, the boundary strength is determined to be equal to 2.
  If block Q is not predicted by application of CIIP and if both of blocks P and Q are predicted by application of inter-prediction, then the boundary strength is determined to be smaller than 2. The exact value of the boundary strength may be determined according to further conditional evaluations such as those shown in FIG. 13.
Otherwise (if the boundary is a vertical boundary or if block P and block Q are comprised inside the same CTU):
  If at least one of the P block or Q block is predicted by application of CIIP, then the boundary strength of the boundary is set equal to 2.
  If both P and Q blocks are not predicted by application of CIIP and if at least one of the P block or Q block is predicted by application of intra-prediction, the boundary strength is determined to be equal to 2.
  If both P and Q blocks are not predicted by application of CIIP and if both P and Q blocks are predicted by application of inter-prediction, then the boundary strength is determined to be smaller than 2. The exact value of the boundary strength may be determined according to further conditional evaluations such as those shown in FIG. 13.
The pixel samples comprised in the P block and the Q block are filtered by application of a deblocking filter according to the determined boundary strength.

Benefit of the Embodiment

Deblocking filtering of blocks that are predicted by application of multi-hypothesis (CIIP) prediction is performed with a deblocking filter with medium strength (boundary strength equal to 1).

If a block is predicted by application of CIIP, a first prediction is obtained by application of inter-prediction and a second prediction is obtained by application of intra-prediction, which are later combined. Since the final prediction includes an intra-prediction part, it is possible that there are block artifacts at the boundaries of a block that is predicted by CIIP. In order to mitigate this problem, the boundary strength is set to 2 according to the disclosure to guarantee filtering of block edges that are predicted by application of CIIP.

Furthermore, the disclosure reduces the required line memory as follows. The line memory is defined as the memory necessary to store the information corresponding to a top CTU row and that is needed during the processing of a neighboring bottom CTU row. For example, in order to filter the horizontal boundary between two CTU rows, the prediction mode information (intra-prediction/inter-prediction/multi-hypothesis (CIIP) prediction) of the top CTU row needs to be stored in the line memory. Since 3 states (intra-prediction/inter-prediction/multi-hypothesis (CIIP) prediction) are possible to describe the prediction mode of a block, the line memory requirement can be defined as 2 bits per block.

According to the disclosure however, if a block (P block in the embodiments) belongs to a top CTU row, the deblocking operation requires only the information about whether the block is predicted by inter-prediction or intra-prediction (therefore only 2 states, which can be stored using one bit per block).

The Reason is as Follows

If a boundary between the P block and the Q block is a horizontal boundary, and if the Q block and the P block belong to two different CTUs (the Q block is the one at the bottom with respect to the P block in all embodiments), then the information whether the P block is predicted by application of CIIP is not utilized in the determination of the boundary strength. Therefore, it does not have to be stored. It is sufficient to determine whether the P block is predicted by intra-prediction to check the first condition of the above-described embodiment 7 as intra-prediction and CIIP are mutually exclusive.

With the help of the disclosure in a hardware implementation, the prediction mode of the P block can be temporarily changed to inter-prediction (when the P block is predicted by CIIP), and the boundary strength determination can be performed according to the changed prediction mode. Afterwards (after the determination of the boundary strength), the prediction mode can be changed back to CIIP. It is noted that hardware implementations are not limited to the method described here (changing the prediction mode of the P block at the CTU boundary). It is just presented as an example to explain that, according to the disclosure, the information of whether the P block is predicted by CIIP is not necessary in the boundary strength determination (at the horizontal CTU boundaries).

Therefore according to the disclosure, the required line memory is reduced from 2 bits per block to 1 bit per block. It is noted that the total line memory that has to be implemented in hardware is proportional to the picture width and inversely proportional to the minimum block width.

Embodiment 8

This embodiment represents a variation of embodiment 6.

For a boundary with two sides (where the spatially adjacent blocks on each side are denoted as P block and Q block), the boundary strength may be determined according to this embodiment as follows:
- If at least one block of P and Q is predicted by application of intra-prediction and not by application of CIIP, then the boundary strength is set equal to 2. Possibilities include the P block being predicted by intra-prediction and not by multi-hypothesis prediction (CIIP) and the Q block being predicted by any prediction function, and vice versa.
- If the P and Q blocks are predicted by the application of inter-prediction or CIIP (Possibilities include the P block being an inter block and the Q block being an inter block, or alternatively the P block being an inter block and the Q block being a CIIP block, or alternatively the P block being a CIIP block and the Q block being an inter block, or alternatively the P block being a CIIP block and the Q block being a CIIP block), the following may apply:
  - If at least one of the blocks P and Q has non-zero transform coefficients, then the boundary strength of the boundary is set equal to 1.
  - Otherwise (if the blocks P and Q have no non-zero transform coefficients), if the absolute difference between the motion vectors that are used to predict the blocks P and Q is greater than or equal to one integer luma sample, then the boundary strength of this boundary is set equal to 1.
  - Otherwise (if the blocks P and Q have no non-zero transform coefficients and the absolute difference between motion vectors is smaller than 1 integer luma sample), if blocks P and Q are predicted on the basis of different reference pictures or the number of motion vectors that are used to predict block P and block Q is not equal, then the boundary strength of this boundary is set equal to 1. The order of these last two conditions may be inverted as shown in FIG. 13.
  - Otherwise (if all of the above 3 conditions are evaluated to be false), the boundary strength of this boundary is set equal to 0.
- If the boundary is a horizontal boundary and P and Q are located in two different CTUs, then:
  - If block Q is predicted by application of CIIP, then the determined boundary strength is modified as follows:
    - If the boundary strength is not equal to 2, then the boundary strength is incremented by 1.
  - If the boundary is a vertical boundary or if block P and block Q are comprised within the same CTU:
    - If at least one of block P and block Q is predicted by application of CIIP, then the boundary strength of the boundary is adjusted as follows:
      - If the boundary strength is not equal to 2, then the boundary strength is incremented by 1.

The pixel samples comprised in block P and block Q are filtered by application of a deblocking filter according to the determined boundary strength.

Benefit of the Embodiment

Deblocking filtering of blocks that are predicted by application of multi-hypothesis prediction, i.e. CIIP, is performed with a deblocking filter with medium strength (boundary strength equal to 1).

If a block is predicted by application of CIIP, a first prediction is obtained by application of inter-prediction and a second prediction is obtained by application of intra-prediction, which are later combined. Since the final prediction includes an intra-prediction part, it is possible that there are block artifacts at the boundaries of a block that is predicted by CIIP. In order to mitigate this problem, the boundary strength is increased by 1 according to the disclosure to guarantee filtering of block edges that are predicted by application of CIIP.

Furthermore, the disclosure reduces the required line memory as follows. The line memory is defined as the memory necessary to store the information corresponding to a top CTU row and that is needed during the processing of a neighboring bottom CTU row. For example, in order to filter the horizontal boundary between two CTU rows, the prediction mode information (intra-prediction/inter-prediction/multi-hypothesis (CIIP) prediction) of the top CTU row needs to be stored in the line memory. Since 3 states (intra-prediction/inter-prediction/multi-hypothesis (CIIP) prediction) are possible to describe the prediction mode of a block, the line memory requirement can be defined as 2 bits per block.

According to the disclosure however, if a block (P block in the embodiments) belongs to a top CTU row, the deblocking operation requires only the information about whether the block is predicted by inter-prediction or intra-prediction (therefore only 2 states, which can be stored using one bit per block).

The Reason is as Follows

If a boundary between the P block and the Q block is a horizontal boundary, and if the P block and the Q block belong to two different CTUs (the Q block is the one at the bottom with respect to the P block in all embodiments), then the information whether the P block is predicted by application of CIIP is not utilized in determination of the boundary strength. Therefore, it does not have to be stored. It is sufficient to determine whether the P block is predicted by intra-prediction to check the first condition of the above-described embodiment 8 as intra-prediction and CIIP are mutually exclusive.

With the help of the disclosure in a hardware implementation, the prediction mode of the P block can be temporarily changed to inter-prediction (when the P block is predicted by CIIP), and the boundary strength determination can be performed according to the changed prediction mode. Afterwards (after the determination of the boundary strength), the prediction mode can be changed back to CIIP. It is noted that hardware implementations are not limited to the method described here (changing the prediction mode of the P block at the CTU boundary). It is just presented as an example to explain that, according to the disclosure, the information of whether the P block is predicted by CIIP is not necessary in the boundary strength determination (at the horizontal CTU boundaries).

Therefore, according to the disclosure, the required line memory is reduced from 2 bits per block to 1 bit per block. It is noted that the total line memory that has to be implemented in hardware is proportional to the picture width and inversely proportional to the minimum block width.

It is noted that, according to all the embodiments above, if a block is predicted by application of CIIP, a first prediction is obtained by application of inter-prediction and a second prediction is obtained by application of intra-prediction, which are later combined.

The embodiments above indicate that the CIIP blocks are considered as intra blocks to a different extent when performing the deblocking filter. Embodiments 1, 2, and 3 use three different strategies to adjust the boundary strength of a boundary.

Embodiment 1 regards the CIIP blocks completely as intra blocks. Therefore, the condition of setting Bs to 2 is the same as in Table 1.

Embodiment 2 considers the distortion caused by CIIP blocks as not as high as by intra blocks. Therefore, when CIIP blocks are detected in a boundary, the Bs is considered as 1.

Embodiment 3 regards the CIIP blocks partially as intra blocks, where the Bs is increased by 1 if at least one adjacent block of a boundary is a CIIP block. If the Bs is already 2 using the conventional derivation strategy of FIG. 13, then the Bs is not changed.

FIG. 11 illustrates the derivation of Bs in VVC Draft 3.0 according to the above-mentioned reference. FIGS. 12, 14 and 15 depict the changes to the Bs derivation for embodiments 1, 2, and 3, respectively.

It is worth noting that for embodiments 1 and 2, not only the potential distortion is reduced, but also the processing logic. In embodiments 1 and 2, as long as the P or Q block is a CIIP block, the checking for coefficients and motion vectors is not necessary anymore, thus shortening the latency for condition checks.

Embodiments 4, 5, and 6 are respective variations of embodiments 1, 2, and 3 where line buffer memory is considered. The main change to embodiments 1, 2 and 3 is that when the P and Q blocks are located in different CTUs and the edge is horizontal, the checking for a CIIP block is performed asymmetrically. Namely, the P side block (i.e. the upper) is not checked, and only the Q side block (i.e. the lower) is checked. In this way, no additional line buffer memory is allocated for storing a CIIP flag of the P side block, which is located in another CTU.

In addition to above six embodiments, one additional feature of CIIP blocks can be that the CIIP blocks do not have to be considered as intra blocks consistently. In one example, when searching for motion vector predictors of the current block, if its neighboring blocks are CIIP blocks then these CIIP blocks' motion vectors can be considered as motion vector predictors. In this case, the inter prediction information of the CIIP blocks is used and hence, the CIIP blocks are not considered as intra blocks anymore. In another example, when constructing the MPM list for intra blocks, the neighboring CIIP blocks of the current block can be considered as including no intra information. Therefore, when checking those CIIP blocks' availability for the current block's MPM list construction, they are labeled as not available. Note that the CIIP blocks mentioned in this paragraph are not only limited to the CIIP blocks that are used to determine the Bs value of the deblocking filter.

In addition to above six embodiments, one additional feature of CIIP blocks can be that the MH blocks are considered as intra blocks consistently. In one example, when searching for motion vector predictors of the current block, if its neighboring blocks are CIIP blocks then these CIIP blocks' motion vectors are excluded from motion vector predictors. In this case, the inter prediction information of the CIIP blocks is not used and hence, the CIIP blocks are considered as intra blocks. In another example, when constructing the MPM list for intra blocks, the neighboring CIIP blocks of the current block can be considered as including intra information. Therefore, when checking those CIIP blocks' availability for the current block's MPM list construction, they are labeled as available. Note that the CIIP blocks mentioned in this paragraph are not only limited to the CIIP blocks that are used to determine the Bs value of the deblocking filter.

Embodiment 9

Figure 16:
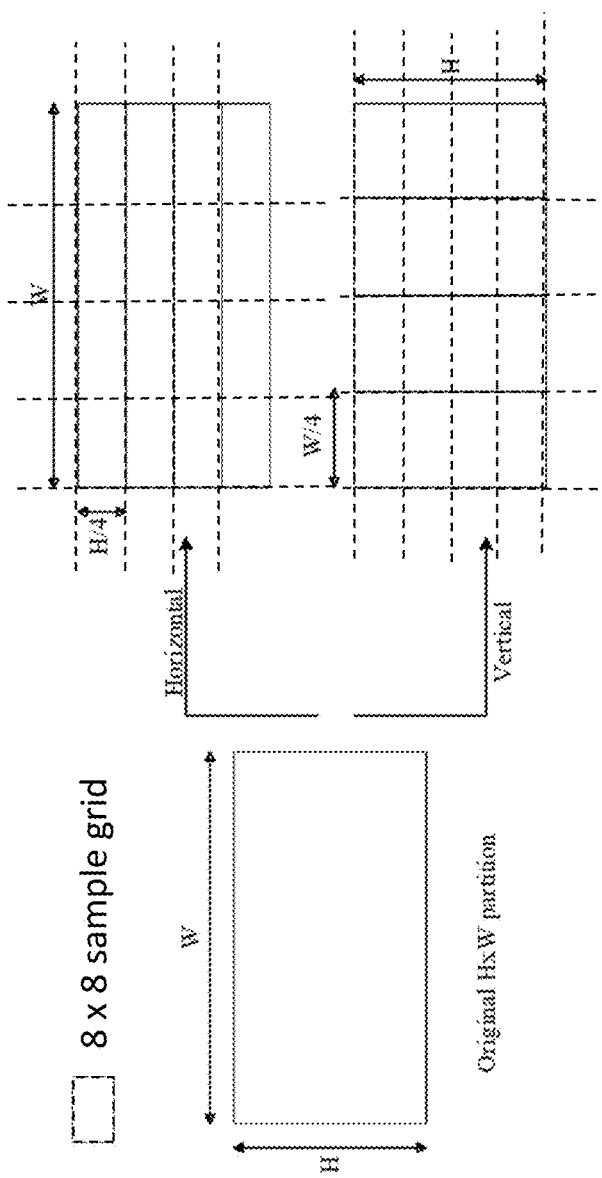
FIG. 16 is a diagram showing sub-block edges within a coding unit in relation to an 8×8 sample grid starting from the top-left sample of the CU.
Figure 17:
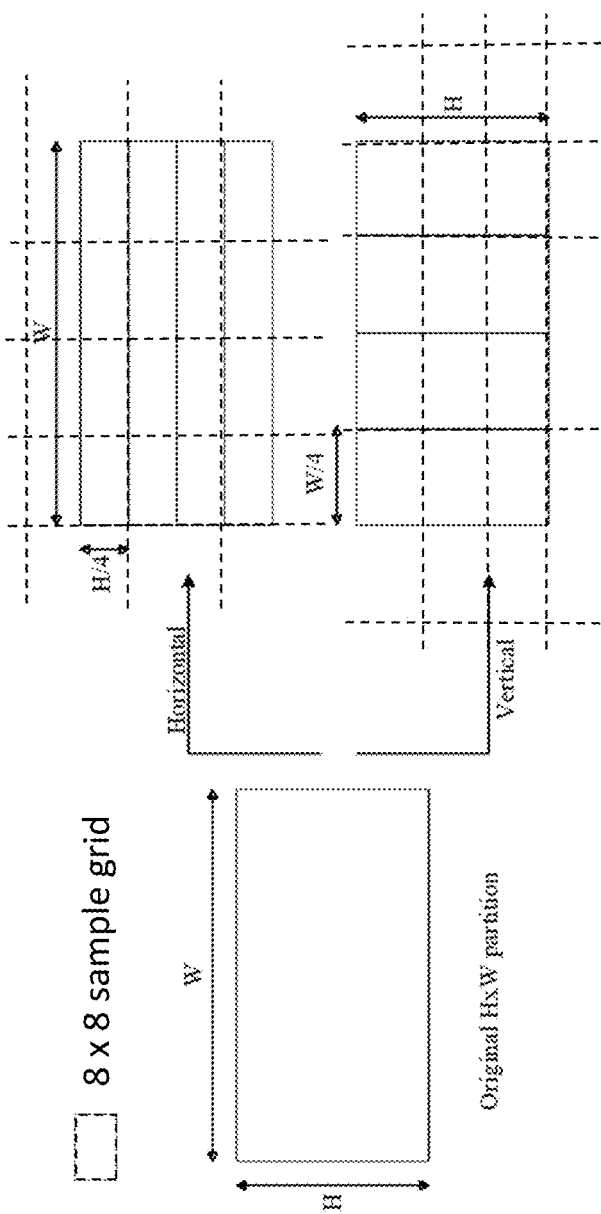
FIG. 17 is a diagram showing sub-block edges within a coding unit in relation to an 8×8 sample grid not starting from the top-left sample of the CU.

In one example, the boundary strength (Bs) of the boundaries of CIIP blocks may be set to a value of 2, but the boundary strength of boundaries of sub-blocks inside CIIP blocks may be set to a value of 1. When the boundaries of sub-blocks are not aligned with an 8×8 sample grid, then the boundary strength of such edges may be set to a value of 0. An 8×8 grid is shown in FIG. 16 or 17 wherein FIG. 16 shows an 8×8 sample grid starting from the top-left sample of the CU and FIG. 17 shows an 8×8 sample grid not starting from the top-left sample of the CU.

In another example, the boundary strength of an edge, may be determined as follows:

For a boundary with two sides (where the spatially adjacent blocks on each side are denoted as P block and Q block), the boundary strength may be derived according to this example as follows:

If the boundary is a horizontal boundary and blocks P and Q are located in different CTUs, then:
If the Q block (where the Q block is denoted as the block that is located below the P block) is predicted by application of CIIP, then the boundary strength is set equal to 2.
If the Q block is not predicted by application of CIIP and if at least one of the P block or the Q block is predicted by application of intra-prediction, the boundary strength is determined to be equal to 2.
If the Q block is not predicted by application of CIIP and if both of the P block and the Q block are predicted by application of inter-prediction, then the boundary strength is determined to be smaller than 2. The exact value of the boundary strength may be determined according to further conditional evaluations such as those shown in FIG. 13.
Otherwise (if P and Q correspond to two sub-blocks inside a CIIP block, i.e. if the target boundary is a sub-block boundary inside a CIIP block):
If the sub-block boundary is aligned with an 8×8 grid, set the boundary strength to a value of 1.
Otherwise (if the sub-block boundary is not aligned with an 8×8 grid), set the boundary strength to a value of 0.

Otherwise (if the boundary is a vertical boundary or if block P and block Q are comprised inside the same CTU, and P and Q are not in the same CIIP block):
  If at least one of the blocks P or Q is predicted by application of CIIP, then the boundary strength parameter of the boundary is set equal to 2.
  If neither the P block nor the Q block is predicted by application of CIIP and if at least one of the P block or the Q block is predicted by application of intra-prediction, the boundary strength is determined to be equal to 2.
  If neither the P block nor the Q block is predicted by application of CIIP and if both of blocks P and Q are predicted by application of inter-prediction, then the boundary strength is determined to be smaller than 2. The exact value of the boundary strength may be determined according to further conditional evaluations such as those shown in FIG. 13.
The pixel samples comprised in block P and block Q are filtered by application of a deblocking filter according to the determined boundary strength.

Figure 18:
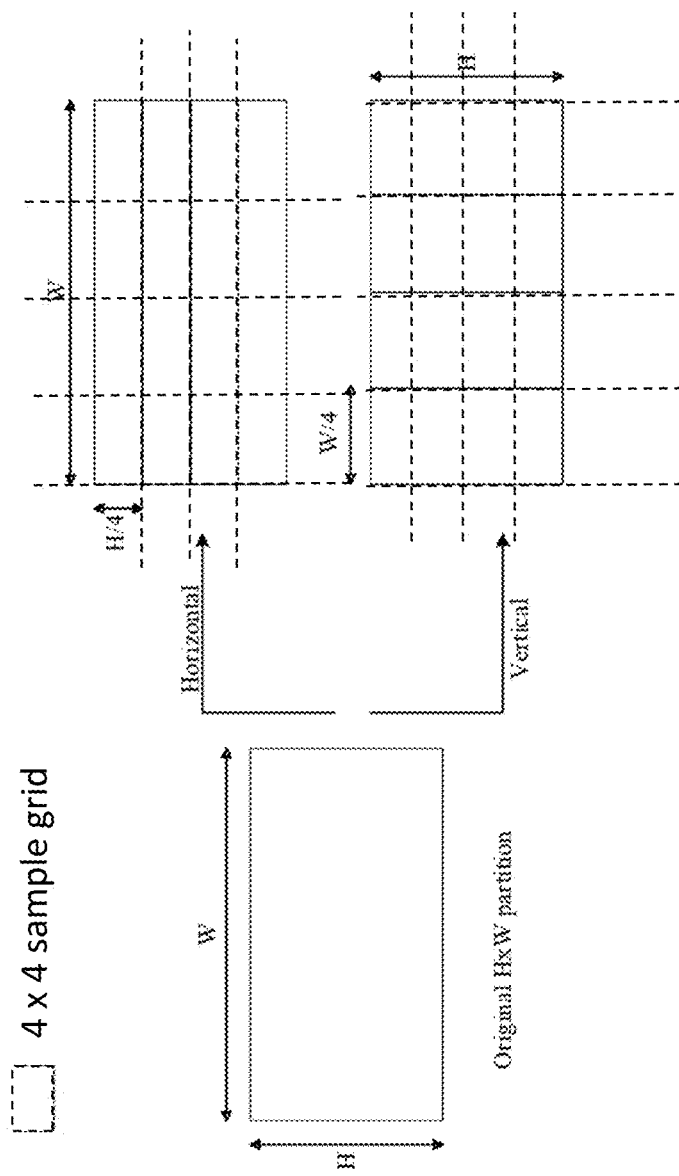
FIG. 18 is a diagram showing sub-block edges within a coding unit in relation to a 4×4 sample grid.

In another example, the boundary strength (Bs) of the boundaries of CIIP blocks may be set to a value of 2, but the boundary strength of boundaries of sub-blocks inside CIIP blocks may be set to a value of 1. When the boundaries of sub-blocks are not aligned with a 4×4 sample grid, then the boundary strength of such edges may be set to a value of 0. A 4×4 grid is shown in FIG. 18.

In another example, the boundary strength of an edge may be determined as follows:
For a boundary with two sides (where the spatially adjacent blocks on each side are denoted as P block and Q block), the boundary strength may be derived according to this example as follows:
  If the boundary is a horizontal boundary and blocks P and Q are located in different CTUs, then:
    If the Q block (where the Q block is denoted as the block that is located below the P Block) is predicted by application of CIIP, then the boundary strength is set equal to 2.
    If the Q block is not predicted by application of CIIP and if at least one of the P block or the Q block is predicted by application of intra-prediction, the boundary strength is determined to be equal to 2.
    If the Q block is not predicted by application of CIIP and if both of the P block and the Q block are predicted by application of inter-prediction, then the boundary strength is determined to be smaller than 2. The exact value of the boundary strength is determined according to further conditional evaluations such as those shown in FIG. 13.
  Otherwise (if P and Q correspond to two sub-blocks inside a CIIP block, i.e. the target boundary is a sub-block boundary inside a CIIP block):
    If the sub-block boundary is aligned with a 4×4 grid, set the boundary strength to a value of 1.
    Otherwise (if the sub-block boundary is not aligned with a 4×4 grid), set the boundary strength to a value of 0.
  Otherwise (if the boundary is a vertical boundary or if the P block and the Q block are comprised inside the same CTU, and P and Q are not in the same CIIP block):
    If at least one of the P block or the Q block is predicted by application of CIIP, then the boundary strength of the boundary is set equal to 2.
    If neither the P block nor the Q block is predicted by application of CIIP and if at least one of the P block or the Q block is predicted by application of intra-prediction, the boundary strength is determined to be equal to 2.
    If neither the P block nor the Q block is predicted by application of CIIP and if both the P block and the Q block are predicted by application of inter-prediction, then the boundary strength is determined to be smaller than 2. The exact value of the boundary strength is determined according to further conditional evaluations such as those shown in FIG. 13.
The pixel samples comprised in block P and block Q are filtered by application of a deblocking filter according to the determined boundary strength.

Embodiment 10 (without line buffer restriction):
For a boundary with two sides (where the spatially adjacent blocks on each side are denoted as P block and Q block), the boundary strength may be derived according to this embodiment as follows:
  If at least one of the blocks P or Q is predicted by application of CIIP and blocks P and Q are not inside the same CIIP block, then the boundary strength of the boundary is set equal to 2.
  If both blocks P and Q are predicted by application of CIIP and blocks P and Q are inside the same CIIP block, then:
    If the sub-block boundary is aligned with an 8×8 grid, the boundary strength is set to a value of 1.
    Otherwise (if the sub-block boundary is not aligned with the 8×8 grid), the boundary strength is set to a value of 0.
  If neither the P block nor the Q block is predicted by application of CIIP and if at least one of the P block or the Q block is predicted by application of intra-prediction, the boundary strength is determined to be equal to 2.
  If neither the P block nor the Q block is predicted by application of CIIP and if both the P block and the Q block are predicted by application of inter-prediction, then the boundary strength is determined to be smaller than 2. The exact value of the boundary strength may be determined according to further conditional evaluations such as those shown in FIG. 13.
The pixel samples comprised in block P and block Q are filtered by application of a deblocking filter according to the determined boundary strength.

Embodiment 11 (without line buffer restriction, and CIIP alignment with 8×8 grid):
For a boundary with two sides (where the spatially adjacent blocks on each side are denoted as P block and Q block), the boundary strength may be derived according to this embodiment as follows:
  If at least one of the blocks P or Q is predicted by application of CIIP and blocks P and Q are not inside the same CIIP block and the boundary is aligned with an 8×8 grid, then the boundary strength of the boundary is set equal to 2.
  If both blocks P and Q are predicted by application of CIIP and blocks P and Q are inside the same CIIP block, then:
    If the sub-block boundary is aligned with an 8×8 grid, set the boundary strength to a value of 1.
    Otherwise (if the sub-block boundary is not aligned with an 8×8 grid), set the boundary strength to a value of 0.
  If neither the P block nor the Q block is predicted by application of CIIP and if at least one of the P block or the Q block is predicted by application of intra-prediction, the boundary strength is determined to be equal to 2.

If neither the P block nor the Q block is predicted by application of CIIP and if both the P block and the Q block are predicted by application of inter-prediction, then the boundary strength is determined to be smaller than 2. The exact value of the boundary strength may be determined according to further conditional evaluations such as those shown in FIG. 13.

The pixel samples comprised in block P and block Q are filtered by application of a deblocking filter according to the determined boundary strength.

Embodiment 12 (without line buffer restriction, TU size restriction, 8×8 grid alignment also for CIIP boundaries):

In one example, the boundary strength (Bs) of the boundaries of CIIP blocks may be set to a value of 2, but the boundary strength of boundaries of sub-blocks inside the CIIP blocks may be set to a value of 1, except for the sub-blocks caused by TU size limitation (as shown in FIG. 8). If a boundary is a TU boundary and its neighboring P and Q blocks belong to the same CIIP block, then the boundary strength of the boundary is set to 2. When the boundaries of sub-blocks or the boundaries of CIIP blocks (the CIIP block size may be smaller than 8×8) are not aligned with an 8×8 sample grid, then the boundary strength of such edges may be set to a value of 0. An 8×8 grid is shown in FIG. 16 or 17, wherein FIG. 16 shows an 8×8 sample grid starting from the top-left sample of the CU and FIG. 17 shows an 8×8 sample grid not starting from the top-left sample of the CU.

For a boundary with two sides (where the spatially adjacent blocks on each side are denoted as P block and Q block), the boundary strength may be derived according to this example as follows:
  If at least one of the blocks P or Q is predicted by application of CIIP and blocks P and Q are not inside the same CIIP block and the boundary is aligned with an 8×8 grid, then the boundary strength of the boundary is set equal to 2.
  If both blocks P and Q are predicted by application of CIIP and blocks P and Q are inside the same CIIP block, then:
    If the sub-block boundary is aligned with an 8×8 grid, set the boundary strength to a value of 2 when the size of at least one of the sub-blocks P or Q is equal to the largest allowed TU size.
    If the sub-block boundary is aligned with an 8×8 grid, set the boundary strength to a value of 1 when the size of none of the sub-blocks P or Q is equal to the largest allowed TU size.
    Otherwise (if the sub-block boundary is not aligned with an 8×8 grid), set the boundary strength to a value of 0.
  If neither the P block nor the Q block is predicted by application of CIIP and if at least one of the P block or the Q block is predicted by application of intra-prediction, the boundary strength is determined to be equal to 2.
  If neither the P block nor the Q block is predicted by application of CIIP and if both the P block and the Q block are predicted by application of inter-prediction, then the boundary strength is determined to be smaller than 2. The exact value of the boundary strength may be determined according to further conditional evaluations such as those shown in FIG. 13.

The pixel samples comprised in block P and block Q are filtered by application of a deblocking filter according to the determined boundary strength.

Embodiment 13 (without line buffer restriction, TU size restriction, 8×8 grid alignment only for CIIP sub-block boundaries):

In one example, the boundary strength (Bs) of the boundaries of CIIP blocks may be set to a value of 2, but the boundary strength of boundaries of sub-blocks inside the CIIP blocks may be set to a value of 1, except for the sub-blocks caused by TU size limitation (as shown in FIG. 8). If a boundary is a TU boundary and its neighboring P and Q blocks belong to the same CIIP block, then the boundary strength of the boundary is set to 2. When the boundaries of sub-blocks of a CIIP block are not aligned with an 8×8 sample grid, then the boundary strength of such edges may be set to a value of 0. An 8×8 grid is shown in FIG. 16 or 17 wherein FIG. 16 shows an 8×8 sample grid starting from the top-left sample of the CU and FIG. 17 shows an 8×8 sample grid not starting from the top-left sample of the CU.

For a boundary with two sides (where the spatially adjacent blocks on each side are denoted as P block and Q block), the boundary strength may be derived according to this example as follows:
  If at least one of the blocks P or Q is predicted by application of CIIP and blocks P and Q are not inside the same CIIP, then the boundary strength of the boundary is set equal to 2.
  If both blocks P and Q are predicted by application of CIIP and blocks P and Q are inside the same CIIP block, then:
    If the sub-block boundary is aligned with an 8×8 grid, set the boundary strength to a value of 2 when the size of at least one of the sub-blocks P or Q is equal to the largest allowed TU size.
    If the sub-block boundary is aligned with an 8×8 grid, set the boundary strength to a value of 1 when the size of none of the sub-blocks P or Q is equal to the largest allowed TU size.
    Otherwise (if the sub-block boundary is not aligned with an 8×8 grid), set the boundary strength to a value of 0.
  If neither the P block nor the Q block is predicted by application of CIIP and if at least one of the P block or the Q block is predicted by application of intra-prediction, the boundary strength is determined to be equal to 2.
  If neither the P block nor the Q block is predicted by application of CIIP and if both the P block and the Q block are predicted by application of inter-prediction, then the boundary strength is determined to be smaller than 2. The exact value of the boundary strength is determined according to further conditional evaluations such as those shown in FIG. 13.

The pixel samples comprised in block P and block Q are filtered by application of a deblocking filter according to the determined boundary strength.

Embodiment 14 (TU transform edges, 8×8 grid alignment only for CIIP sub-blocks):

In one example, the boundary strength (Bs) of the boundaries of CIIP blocks or boundaries of transform units may be set to a value of 2, but the boundary strength of boundaries of sub-blocks inside CIIP blocks may be set to a value of 1. When the boundaries of sub-blocks or the boundaries of transform units or the boundaries of CIIP blocks are not aligned with an 8×8 sample grid, then the boundary strength of such edges may be set to a value of 0. For example, an 8×8 grid can be as shown in FIG. 16 or 17 wherein FIG. 16 shows an 8×8 sample grid starting from the top-left sample of the CU and FIG. 17 shows an 8×8 sample grid not starting from the top-left sample of the CU.

For a boundary with two sides (where the spatially adjacent blocks on each side are denoted as P block and Q block, and said boundary is aligned with an 8×8 grid), the boundary strength may be derived according to this embodiment as follows:

If at least one of the P block or the Q block is predicted by application of intra-prediction, the boundary strength is determined to be equal to 2.

Otherwise, if at least one of the blocks P or Q is predicted by application of CIIP and blocks P and Q are not inside the same CIIP block, then the boundary strength parameter of the boundary is set equal to 2.

Otherwise, if both blocks P and Q are predicted by application of CIIP and blocks P and Q are inside the same CIIP block, i.e. in the case of a sub-block boundary, then:

If the sub-block boundary is aligned with a transform unit, then set the boundary strength of the sub-block boundary to a value of 2.

Otherwise, set the boundary strength of the sub-block boundary to a value of 1.

If neither the P block nor the Q block is predicted by application of CIIP and if both the P block and the Q block are predicted by application of inter-prediction, then the boundary strength is determined to be smaller than 2. The exact value of the boundary strength is determined according to further conditional evaluations such as those shown in FIG. 13.

The pixel samples comprised in block P and block Q are filtered by application of a deblocking filter according to the determined boundary strength.

Embodiment 15

In another example, the process of determining the boundary strength according to the present disclosure may be described in the pseudo-code language as used in the VVC Draft 3.0 according to the above-mentioned reference as follows:

Inputs to this process are:

a picture sample array recPicture, a location (xCb, yCb) specifying the top-left sample of the current coding block relative to the top-left sample of the current picture, a variable nCbW specifying the width of the current coding block, a variable nCbH specifying the height of the current coding block, a variable edgeType specifying whether a vertical (EDGE_VER) or a horizontal (EDGE_HOR) edge is filtered, a two-dimensional (nCbW)×(nCbH) array edgeFlags.

The output of this process is a two-dimensional (nCbW)×(nCbH) array bS specifying the boundary filtering strength.

The variables $xD_i$, $yD_j$, xN and yN are derived as follows:

If edgeType is equal to EDGE_VER, $xD_i$ is set equal to (i<<3), $yD_j$ is set equal to (j<<2), xN is set equal to Max(0,(nCbW/8)−1) and yN is set equal to (nCbH/4)−1.

Otherwise (edgeType is equal to EDGE_HOR), $xD_i$ is set equal to (i<<2), $yD_j$ is set equal to (j<<3), xN is set equal to (nCbW/4)−1 and yN is set equal to Max(0, (nCbH/8)−1).

For $xD_i$ with i=0 . . . xN and $yD_j$ with j=0 . . . yN, the following applies:

If edgeFlags[$xD_i$][$yD_j$] is equal to 0, the variable bS[$xD_i$][$yD_j$] is set equal to 0.

Otherwise, the following applies:

The sample values $p_0$ and $q_0$ are derived as follows:

If edgeType is equal to EDGE_VER, $p_0$ is set equal to recPicture [xCb+$xD_i$−1][yCb+$yD_j$] and $q_0$ is set equal recPicture [xCb+$xD_i$][yCb+$yD_j$].

Otherwise (edgeType is equal to EDGE_HOR), $p_0$ is set equal to recPicture [xCb+$xD_i$][yCb+$yD_j$−1] and $q_0$ is set equal to recPicture [xCb+$xD_i$][yCb+$yD_j$].

The variable bS[$xD_i$][$yD_j$] is derived as follows:

If the sample $p_0$ or $q_0$ is in the coding block of a coding unit coded with intra prediction mode, bS[$xD_i$][$yD_j$] is set equal to 2.

Otherwise, if the block edge is also a transform block edge and the sample p0 or q0 has ciip_flag equal to 1, bS[$xD_i$][$yD_j$] is set equal to 2.

Otherwise, if the sample p0 or q0 has ciip_flag equal to 1, bS[$xD_i$][$yD_j$] is set equal to 1.

Otherwise, if the block edge is also a transform block edge and the sample $p_0$ or $q_0$ is in a transform block which contains one or more non-zero transform coefficient levels, bS[$xD_i$][$yD_j$] is set equal to 1.

Otherwise, if one or more of the following conditions are true, bS[$xD_i$][$yD_j$] is set equal to 1:

For the prediction of the coding sub-block containing the sample $p_0$ different reference pictures or a different number of motion vectors are used than for the prediction of the coding sub-block containing the sample $q_0$.

NOTE 1—The determination of whether the reference pictures used for the two coding sub-blocks are the same or different is based only on which pictures are referenced, without regard to whether a prediction is performed using an index into reference picture list 0 or an index into reference picture list 1, and also without regard to whether the index position within a reference picture list is different.

NOTE 2—The number of motion vectors that are used for the prediction of a coding sub-block with top-left sample covering (xSb, ySb), is equal to PredFlagL0[xSb][ySb]+PredFlagL1[xSb][ySb].

One motion vector is used to predict the coding sub-block containing the sample $p_0$ and one motion vector is used to predict the coding sub-block containing the sample $q_0$, and the absolute difference between the horizontal or vertical component of the motion vectors used is greater than or equal to 4 in units of quarter luma samples.

Two motion vectors and two different reference pictures are used to predict the coding sub-block containing the sample $p_0$, two motion vectors for the same two reference pictures are used to predict the coding sub-block containing the sample $q_0$ and the absolute difference between the horizontal or vertical component of the two motion vectors used in the prediction of the two coding sub-blocks for the same reference picture is greater than or equal to 4 in units of quarter luma samples.

Two motion vectors for the same reference picture are used to predict the coding sub-block containing the sample $p_0$, two motion vectors for the same reference picture are used to predict the coding sub-block containing the sample $q_0$ and both of the following conditions are true:

The absolute difference between the horizontal or vertical component of list 0 motion vectors used in the prediction of the two coding sub-blocks is greater than or equal to 4 in quarter luma samples, or the absolute difference between the horizontal or vertical component of the list 1 motion vectors used in the prediction of the two coding sub-blocks is greater than or equal to 4 in units of quarter luma samples.

The absolute difference between the horizontal or vertical component of list 0 motion vector used in the prediction of the coding sub-block containing the sample $p_0$ and the list 1 motion vector used in the prediction of the coding sub-block containing the sample $q_0$ is greater than or equal to 4 in units of quarter luma samples, or the absolute difference between the horizontal or vertical component of the list 1 motion vector used in the prediction of the coding sub-block containing the sample $p_0$ and list 0 motion vector used in the prediction of the coding sub-block containing the sample $q_0$ is greater than or equal to 4 in units of quarter luma samples.

Otherwise, the variable $bS[xD_i][yD_j]$ is set equal to 0.

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general, only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A coding method, comprising:
   determining whether a current coding unit is predicted by application of combined inter-intra prediction (CIIP);
   in response to determining that the current coding unit is predicted by application of CIIP, setting a boundary strength of a boundary of the current coding unit to a first value, wherein the coding includes decoding or encoding;
   upon determination that the current coding unit is not predicted by application of CIIP, determining whether the boundary of the current coding unit is an edge of a transform block and the transform block comprises one or more non-zero transform coefficient levels;

upon determination that the boundary of the current coding unit is an edge of a transform block and the transform block comprises one or more non-zero transform coefficient levels, setting the boundary strength of the boundary of the current coding unit to a second value; and filtering a reconstructed block based on the boundary strength to obtain a filtered block.

2. The method of claim 1, wherein the first value is within a range from 1 to 2.

3. The method of claim 1, wherein the first value is 2.

4. The method of claim 1, wherein the first value is 1.

5. The method of claim 4, further comprising:
incrementing the first value by 1 in response to determining that one of the following conditions is satisfied:
at least one of the current coding unit and an adjacent coding unit that is adjacent to the boundary of the current coding unit has non-zero transform coefficients,
an absolute difference between motion vectors used to predict the current coding unit and the adjacent coding unit is greater than or equal to one integer sample,
the current coding unit and the adjacent coding unit are predicted based on different reference pictures, or
a number of motion vectors used to predict the current coding unit and the adjacent coding unit differs.

6. The method of claim 1, further comprising:
setting a boundary strength of a boundary of a sub-coding unit to a second value, the current coding unit comprises at least two sub-coding units, and the boundary of the sub-coding unit is a boundary between the at least two sub-coding units.

7. The method of claim 6, wherein the second value is 1.

8. The method of claim 6, wherein when the boundary of the sub-coding unit is an edge of a transform unit, the second value is equal to the first value.

9. The method of claim 6, wherein when the boundary of the sub-coding unit is not an edge of a transform unit, the second value is different from the first value.

10. The method of claim 1, further comprising:
determining whether the boundary of the current coding unit is aligned with an 8×8 grid; and
in response to determining that the boundary of the current coding unit is not aligned with the 8×8 grid, setting the boundary strength of the boundary of the current coding unit to zero.

11. The method of claim 6, further comprising:
determining whether the boundary of the sub-coding unit is aligned with a sub-grid, the sub-grid being a 4×4 grid or an 8×8 grid, and
in response to determining that the boundary of the sub-coding unit is not aligned with the sub-grid, setting the boundary strength of the boundary of the sub-coding unit to zero.

12. A computer program product comprising instructions which, when the instructions are executed by a computer, cause the computer to perform operations of:
determining whether a current coding unit is predicted by application of combined inter-intra prediction (CIIP); and
in response to determining that the current coding unit is predicted by application of CIIP, setting a boundary strength of a boundary of the current coding unit to a first value;

upon determination that the current coding unit is not predicted by application of CIIP, determining whether the boundary of the current coding unit is an edge of a transform block and the transform block comprises one or more non-zero transform coefficient levels;

upon determination that the boundary of the current coding unit is an edge of a transform block and the transform block comprises one or more non-zero transform coefficient levels, setting the boundary strength of the boundary of the current coding unit to a second value; and filtering a reconstructed block based on the boundary strength to obtain a filtered block.

13. A decoder, comprising:
one or more processors; and
a non-transitory computer-readable storage medium coupled to the one or more processors and storing instructions for execution by the one or more processors, wherein the instructions, when executed by the one or more processors, configure the decoder to perform operations of:
determining whether a current coding unit is predicted by application of combined inter-intra prediction (CIIP);
in response to determining that the current coding unit is predicted by application of CIIP, setting a boundary strength of a boundary of the current coding unit to a first value;
upon determination that the current coding unit is not predicted by application of CIIP, determining whether the boundary of the current coding unit is an edge of a transform block and the transform block comprises one or more non-zero transform coefficient levels;
upon determination that the boundary of the current coding unit is an edge of a transform block and the transform block comprises one or more non-zero transform coefficient levels, setting the boundary strength of the boundary of the current coding unit to a second value; and
filtering a reconstructed block based on the boundary strength to obtain a filtered block.

14. The decoder of claim 13, wherein the first value is 2.

15. The decoder of claim 13, wherein the first value is 1.

16. The decoder of claim 15, wherein the instructions, when executed by the one or more processors, configure the decoder to perform operations of:
incrementing the first value by 1 in response to determining that one of the following conditions is satisfied:
at least one of the current coding unit and an adjacent coding unit that is adjacent to the boundary of the current coding unit has non-zero transform coefficients,
an absolute difference between motion vectors used to predict the current coding unit and the adjacent coding unit is greater than or equal to one integer sample,
the current coding unit and the adjacent coding unit are predicted based on different reference pictures, or
a number of motion vectors used to predict the current coding unit and the adjacent coding unit differs.

17. An encoder, comprising:
one or more processors; and
a non-transitory computer-readable storage medium coupled to the one or more processors and storing instructions for execution by the one or more processors, wherein the instructions, when executed by the one or more processors, configure the encoder to perform operations of:
determining whether a current coding unit is predicted by application of combined inter-intra prediction (CIIP);

in response to determining that the current coding unit is predicted by application of CIIP, setting a boundary strength of a boundary of the current coding unit to a first value;

upon determination that the current coding unit is not predicted by application of CIIP, determining whether the boundary of the current coding unit is an edge of a transform block and the transform block comprises one or more non-zero transform coefficient levels;

upon determination that the boundary of the current coding unit is an edge of a transform block and the transform block comprises one or more non-zero transform coefficient levels, setting the boundary strength of the boundary of the current coding unit to a second value; and filtering a reconstructed block based on the boundary strength to obtain a filtered block.

18. The encoder of claim 17, wherein the first value is 2.

19. The encoder of claim 17, wherein the first value is 1.

20. A video data decoding device, comprising:

a non-transitory memory storage, configured to store video data in a form of a bitstream; and a video decoder, configured to perform the method according to claim 1.

* * * * *